(12) United States Patent
Pingte et al.

(10) Patent No.: US 7,711,695 B2
(45) Date of Patent: May 4, 2010

(54) REDUCING MEMORY USED BY METADATA FOR DUPLICATE USER DEFINED TYPES

(75) Inventors: Rajendra S. Pingte, Foster City, CA (US); Srinath Krishnaswamy, Fremont, CA (US)

(73) Assignee: Oracle International Corporation, Redwood Shores, CA (US)

(*) Notice: Subject to any disclaimer, the term of this patent is extended or adjusted under 35 U.S.C. 154(b) by 361 days.

(21) Appl. No.: 11/038,596

(22) Filed: Jan. 18, 2005

(65) Prior Publication Data

US 2006/0167900 A1 Jul. 27, 2006

(51) Int. Cl.
*G06F 17/30* (2006.01)
*G06F 15/16* (2006.01)

(52) U.S. Cl. .............................. 707/103 Y; 707/103 R; 717/116

(58) Field of Classification Search .............. 707/103 Y, 707/103 R; 717/116
See application file for complete search history.

(56) References Cited

U.S. PATENT DOCUMENTS

| | | | | |
|---|---|---|---|---|
| 6,112,207 A | | 8/2000 | Nori et al. | 707/101 |
| 6,128,621 A | * | 10/2000 | Weisz | 707/103 Y |
| 6,377,953 B1 | | 4/2002 | Gawlick et al. | 707/102 |
| 6,470,348 B1 | | 10/2002 | Govindarajan et al. | 707/101 |
| 6,782,394 B1 | | 8/2004 | Landeck et al. | 707/104.1 |
| 2002/0073061 A1 | * | 6/2002 | Collins | 707/1 |
| 2004/0267834 A1 | * | 12/2004 | Sasaki et al. | 707/201 |

OTHER PUBLICATIONS

"Create Type" in Oracle 9i SQL Reference, Release 9.2, Part No. A96540-02, Copyright 2000, 2002, 15 pages total.
"Create Type Body" in Oracle 9i SQL Reference, Release 9.2, Part No. A96540-02, Copyright 2000, 2002, 5 pages total.
John Weisz, "Pickler Architecture and Component Specification", Jun. 6, 1996, pp. 1-37.
Nick Popovic et al., "Oracle Object Performance Implication—An Introduction", (believed to be prior to Jan. 18, 2005), pp. 1-12.
"1 Introduction to Oracle Objects", Oracle® Database Application Developer's Guide-Object-Relational Features, 10g Release 1 (10.1), Part No. B10799-01, 10 pages total.

(Continued)

*Primary Examiner*—John E Breene
*Assistant Examiner*—Alex Gofman
(74) *Attorney, Agent, or Firm*—Silicon Valley Patent Group LLP; Omkar Suryadevara

(57) ABSTRACT

A computer automatically identifies multiple occurrences of an abstract data type that is embedded within an object of metadata of another abstract data type (hereinafter "top-level" abstract data type), e.g. by recursively visiting each element of the top-level abstract data type. Then the computer automatically generates, for the top-level abstract data type, a tap-level description that contains a description of each embedded abstract data type. At several locations in the top-level description that correspond to occurrences of a given embedded abstract data type in the top-level abstract data type, the computer automatically inserts offsets that identify a common position where the single description of that given embedded abstract data type is present in the tap-level description. Use of multiple offsets that identify a common position of an embedded description reduces space. The space was otherwise occupied by multiple embedded descriptions in prior art's top-level descriptions.

34 Claims, 16 Drawing Sheets

OTHER PUBLICATIONS

Jurgen Annevelink et al., "Object SQL—A Language for the Design and Implementation of Object Databases", Mar. 1994, pp. 1-22.
Edited by Won Kim and Frederick H. Lochovsky, "Object-Oriented Concepts, Databases, and Applications", ACM Press Frontier Series, Copyright 1989, (Chapter 10, pp. 219-249, Chapter 11, pp. 250-282, Chapter 12, pp. 283-308, Chapter 13, pp. 309-337).
XML Schema Part 0: Primer Second Edition, W3C Recommendation, Oct. 28, 2004, pp. 71.

* cited by examiner

FIG. 1C (PRIOR ART)

Type Descriptor Object (TDO)

- version
- schema name
- type name
- user readable version
- type code
- TDS pointer
- null TDS pointer
- flag
- cref pointer

```
Layout Manager:
    Start Manager TDS::= 4byte-length, version, flags { Start ADT
        Internal Offset from here to Person UPT - /* Manager */
        Internal Offset from here to Employees[] UPT or user defined type (integer of
        Employee elements)
        } End ADT
            Start Person TDS::= 4byte-length, version, flags {Start ADT /*Manager */
            Name - char
            Internal Offset from here to Address[] UPT or user defined type (integer of
            address elements)
            } End ADT
            {
            Address UPT data
                Start Address TDS::= 4byte-length, version, flags { Start ADT
                Street - char, City - char, Zip - integer, State - char
                } End ADT
                {Index definition}
                End Address TDS
            }
            {Index definition}
            End Person TDS /* Manager */
        Start Employee TDS::= 4byte-length, version, flags { Start ADT
        Internal Offset from here to Person UPT
        } End ADT
            Start Person TDS::= 4byte-length, version, flags { Start ADT
            Name - char
            Internal Offset from here to Address[] UPT or user defined type
            (integer of address elements)
            } End ADT
            {
            Address UPT data
                Start Address TDS::= 4byte-length, version, flags { Start ADT
                Street - char, City - char, Zip - integer, State - char
                } End ADT
                {Index definition}
                End Address TDS
            }
            {Index definition}
            End Person TDS
        {Index definition}
        End Employee TDS
    {Index definition}
    End Manager TDS
```

FIG. 1F
(PRIOR ART)

```
Start CEO TDS::=
    4byte-length,
    version,
    flags
    { - Start ADT
    Internal Offset to Person UDT - /* CEO Level Attribute*/
    Internal Offset to Manager[] UPT or user defined type (number of Manager elements)
    } End ADT
        Start Person TDS::=  /* CEO Level Attribute*/
            4byte-length,
            version,
            flags
            { - Start ADT
            Name, (char)
            Internal Offset to Address[] UPT or user defined type (number of address elements)
            } End ADT
            {
            Address UPT data
                    Start Address TDS::=
                        4byte-length,
                        version,
                        flags
                        { - Start ADT
                        Street - char
                        City - chare
                        Zip - number
                        State - char
                        } End ADT
                        {Index definition}
                        End Address TDS
            }
            {Index definition}
        End Person TDS  /* CEO Level Attribute*/
        Start Manager TDS::=  /* CEO Level Attribute*/
        4byte-length,
        version,
        flags
        { - Start ADT
        Internal Offset to Person UDT
        Internal Offset to Employees UDT
        } End ADT
            Start Person TDS::=  /* Manager Level Attribute */
            4byte-length,
            version,
            flags
            { - Start ADT
            Name, (char)
            Internal Offset to Address[] UPT or user defined type (number of address elements)
            } End ADT
            {
            Address UPT data
                    Start Address TDS::=
                        4byte-length,
                        version,
                        flags
                        { - Start ADT
                        Street - char
                        City - chare
                        Zip - number
                        State - char
                        } End ADT
                        {Index definition}
                        End Address TDS
            }
            {Index definition}
            End Person TDS  /* Manager Level Attribute */
```

FIG. 1G1 (PRIOR ART)

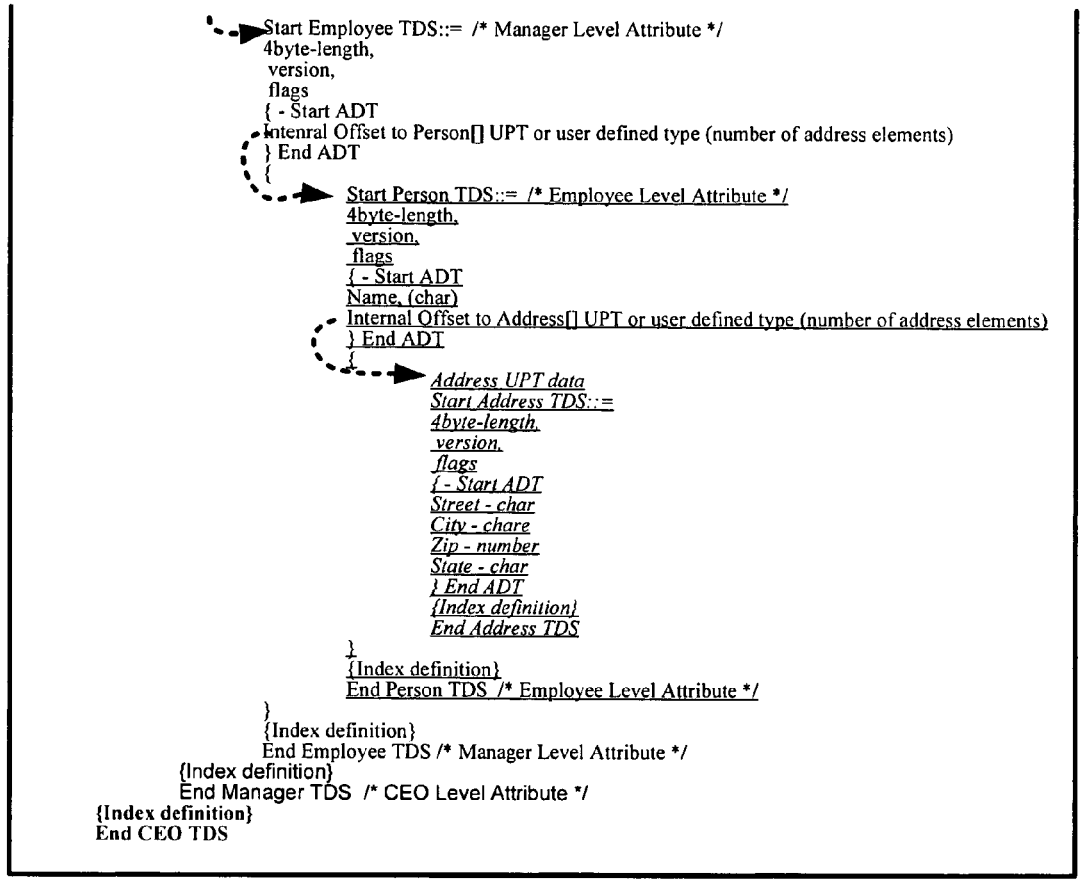
FIG. 1G2(PRIOR ART)
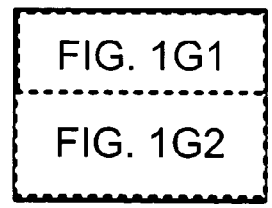
FIG. 1G
(PRIOR ART)

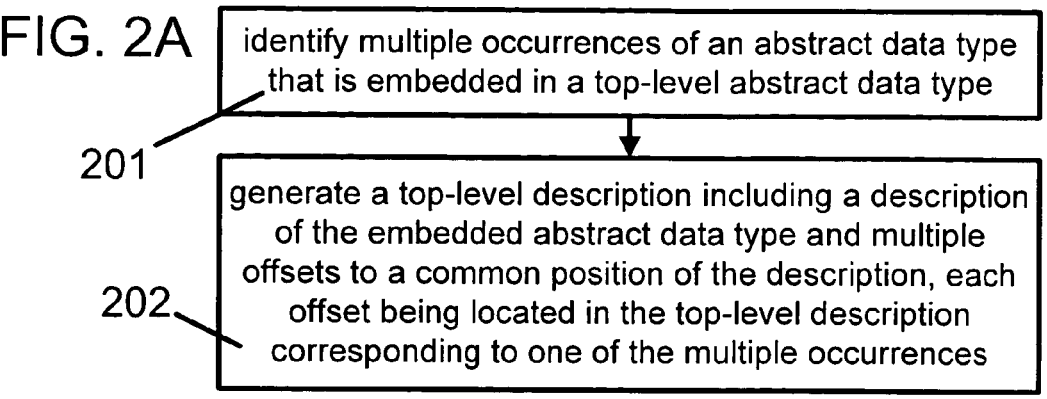
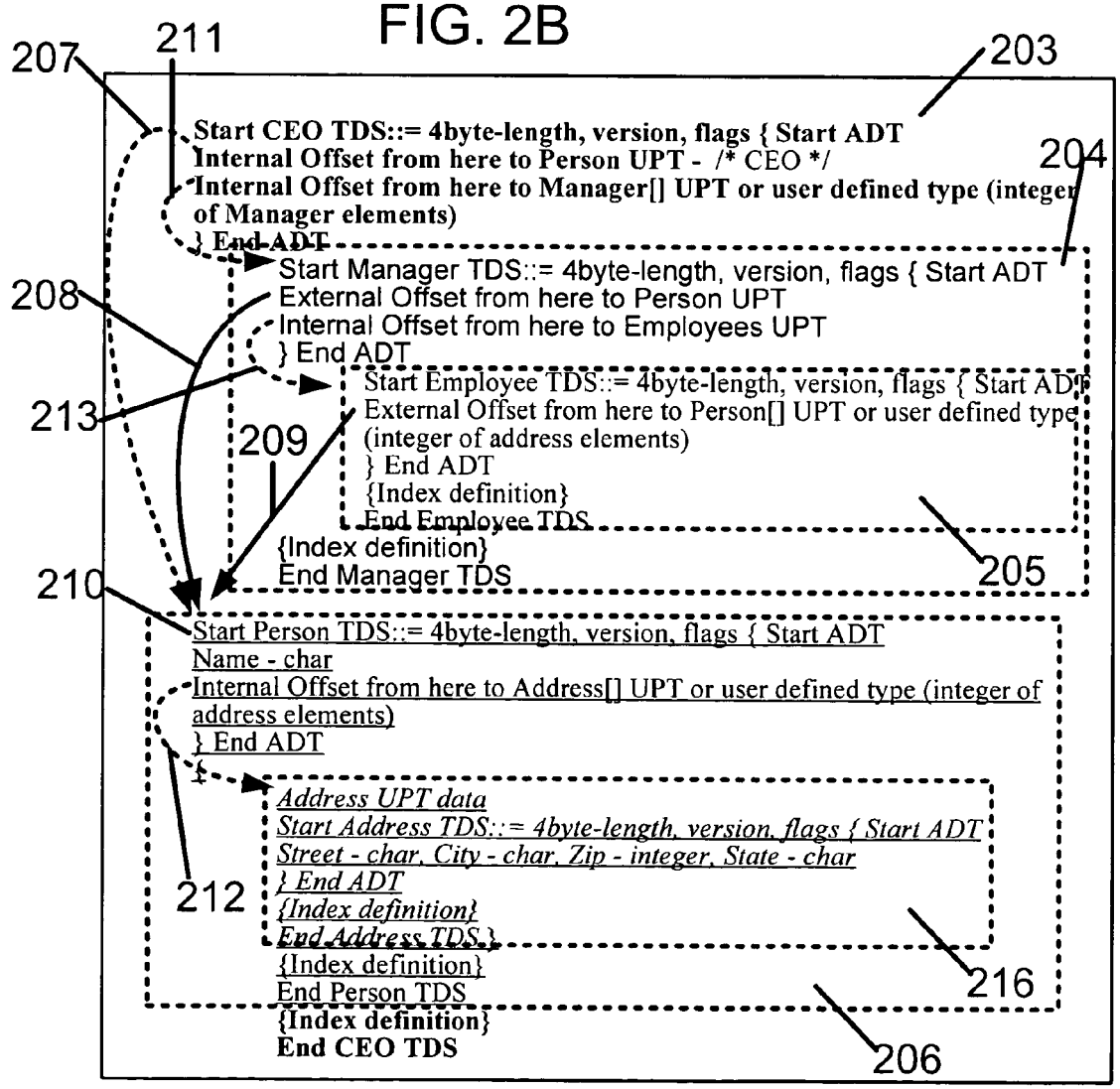

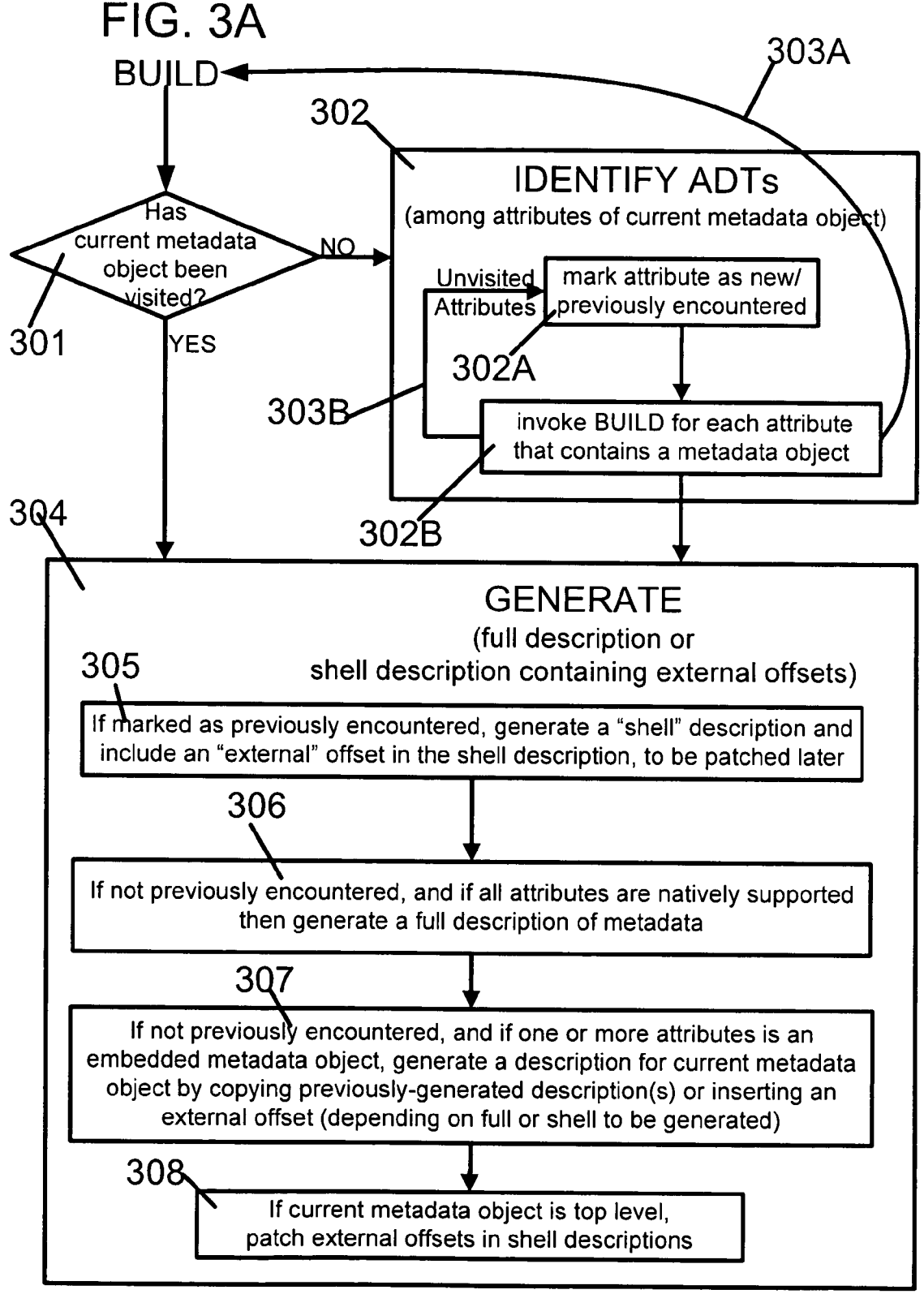

FIG. 3C

```
Start Person TDS::= 4byte-length, version, flags { Start ADT    323E
            External Offset = 0; to be patched later to point from
            here to full TDS for Person UPT
            } End ADT
            {Index definition}
            End Person TDS
```
323

FIG. 3D

```
Start Person TDS::= 4byte-length, version, flags { Start ADT
            External Offset = 0; to be patched later to point from
            here to full TDS for Person UPT
            } End ADT
            {Index definition}
            End Person TDS
```
324

FIG. 3E

```
Start Employee TDS::= 4byte-length, version, flags { Start ADT
            External Offset =0; to be patched later to point from here to full
            TDS for Person UPT
            } End ADT
            {Index definition}
            End Employee TDS
```
325

```
Start Manager TDS::= 4byte-length, version, flags { Start ADT    326I
            External Offset =0; to be patched later to point to Person UPT
            Internal Offset from here to Employee UPT
            } End ADT
               Start Employee TDS::= 4byte-length, version, flags { Start ADT
                  External Offset=0; to be patched later to point to Person UPT
                  } End ADT
                  {Index definition}
                  End Employee TDS
            {Index definition}
            End Manager TDS
```

| level=1 | weight=3 | *pcell=402 | pos=2 |
|---|---|---|---|
| level=2 | weight=1 | *pcell=406 | pos=6 |
| level=3 | weight=1 | *pcell=404 | pos=4 |
| level=3 | weight=1 | *pcell=403 | pos=3 |

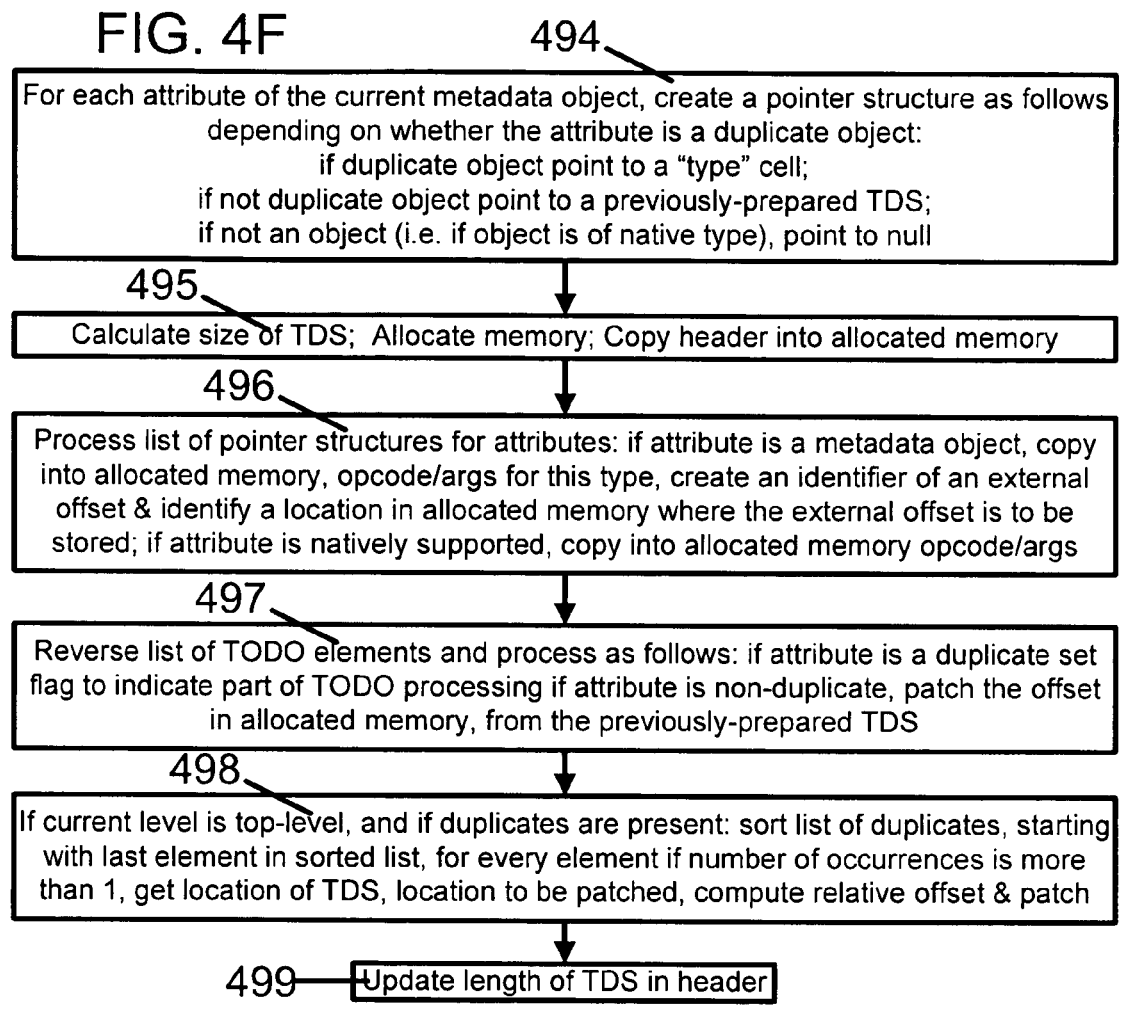

REDUCING MEMORY USED BY METADATA FOR DUPLICATE USER DEFINED TYPES

BACKGROUND

U.S. Pat. Nos. 6,128,621, 6,112,207 and 6,377,953 are each incorporated by reference herein in their entirety as background.

As stated in U.S. Pat. No. 6,128,621, computer programming languages commonly represent information structures using abstract data types ("ADTs"). A detailed discussion of ADTs is found in a book by N. Wirth, entitled "Algorithms+ Data Structures=Programs" (Englewood Cliffs, N.J.: Prentice-Hall, 1976), also incorporated by reference herein in its entirety as background. ADTs may be specified in a "create type" command to a database, as described in sections entitled "CREATE TYPE" and "CREATE TYPE BODY" in ORACLE 9i SQL Reference, Release 9.2, Part Number A96540-02 also incorporated by reference herein in its entirety as background. See also an article entitled "Object SQL—A Language For The Design And Implementation of Object Databases" by Jurgen Annevelink et al. in a book entitled "Modern Database Systems" published 1995, pages 42-68 also incorporated by reference herein in its entirety as background. See also U.S. Pat. No. 6,782,394 granted to Landeck et al. on Aug. 24, 2004 and 6,470,348 granted to Govindarajan et al. on Oct. 22, 2002 both of which are incorporated by reference herein in their entirety.

An example that uses ADTs is illustrated in FIG. 1A. Specifically, as shown in FIG. 1A, a programmer 101 issues to computer 100 a command to create ADT 111 called "Address" which contains four fields each of which has a data type, such as "char" and "integer" that is native to computer 100. In this example, all "char" fields (such as Street, City and State) store strings (for example up to 80 characters long). The field for a zip code is stored as an integer value that is 32 bits long. Such ADTs, which are initially defined by a programmer 101, are also referred to below as UPTs and they can be used to derive a more specific type of ADT from a base type (in Object Oriented programming terms). Specifically, a UPT is a pointer to an ADT where the ADT can be used to derive other types (that is it can be polymorphic). In the database system "Oracle9i" one would create this ADT using the create type SQL statement by having a "NOT FINAL" clause at the end.

Commands from programmer 101 are first converted into dynamic (run-time) objects called Type Descriptor Objects (TDOs) that are temporarily held in volatile memory and eventually stored persistently in a dictionary of a database. A TDO contains an Attribute Definition in the form of information shown in FIG. 1C including a pointer to, a Type Descriptor Segment (TDS). Each TDO holds metadata about a corresponding ADT that is defined by programmer 101. In the example illustrated in FIGS. 1A and 1B, the reference number for a TDO is obtained by adding 10 to a reference numeral that identifies a corresponding command to create the ADT. In this particular example, a command 111 to create Address ADT in FIG. 1A results in creation of Address TDO 121 in volatile memory 110 of FIG. 1B.

Referring to FIG. 1A, after issuing a command 111 to define the above-described Address ADT, programmer 101 may define one or more additional ADTs that use (i.e. inherit) the Address ADT. For example, FIG. 1A illustrates an ADT called "Person" which is created in response to a command 112 by programmer 101 to hold a character string field for a person's name and the just-described address ADT. Note that use of Address ADT in the definition of person ADT is accepted by computer 100 at this stage because ADT 111 was earlier defined by programmer 101. Note also that, if an ADT that is being processed (also called top-level ADT, i.e. ADT at the lowest depth) has multiple copies of an ADT embedded at different levels, then the corresponding TDO for the top-level ADT contains multiple copies of the same object. Specifically, each TDO of the prior art, as shown in FIG. 1B, holds all metadata required to interpret a data object of that ADT, including metadata for each embedded ADT. In the example, TDO 123 for an Employee ADT contains metadata not only for attributes of Person, but also for attributes of Address (which is an attribute of Person). Similarly, TDO 124 for the Manager ADT contains metadata for Person twice, once for the Person attribute in Manager, and another time for the Person ADT embedded within the Employee attribute in Manager. For this reason, when programmer 101 issues three commands 111, 112 and 113, prior art computer 100 prepares metadata describing the Address ADT three times, once in each of TDOs 121, 122 and 123.

TDOs 121-125 held in memory 110 also contain a pointer to a Type Descriptor Segment "TDS" that allows one to determine the attributes within the TDO object by use of an opcode. TDS is a description of metadata for use in interpreting the contents of object data, it has a length/data tuple describing each attribute. Note that an XML document that contains repeated definitions of object types may be parsed for representation in a database, with each XML tag or type is represented as a TDO in Oracle. TDSs are described in U.S. Pat. No. 6,128,621 (incorporated by reference herein in its entirety). Specifically, U.S. Pat. No. 6,128,621 describes a "pickler" that receives a TDS as input and prepares a serialized description that can be either transmitted or written to disk. U.S. Pat. No. 6,128,621 states that preferably, the TDO is a table of a database, and each TDS is a record or row of the table. The TDS comprises fields that correspond to attributes of the ADT. Each ADT attribute, if native to computer 100, when described in-line in the TDS can be represented in such a database as a column in the TDO table. As noted above, if an attribute specified in a "create type" command is itself an ADT (such as a UPT that contains native data types or one or more ADTs embedded therein), then that attribute is "flattened" on conversion into TDS. Note that the above-described ADTs (and hence the corresponding TDOs and TDSs) may support inheritance of the type found in an object-oriented language, such as C++. When inheritance is supported, an ADT in a TDO may inherit properties of a previously defined ADT.

As illustrated for an Address ADT in FIG. 1C, each TDO has several fields which are described next. A version field in FIG. 1C identifies the version (e.g. 1.0) in which the TDO is created. A schema name in FIG. 1C identifies the user who created the type (e.g. as "user1"). A name of the type (i.e. the name of the ADT) is identified, e.g. as "address". A version number in string form which is user readable is also included in the TDO, for displaying to humans. A type code which is the opcode for the ADT, indicates that the type is an integer, character, varray, nested table, or an ADT. The TDO also includes a TDS pointer which is the pointer to the corresponding TDS, such as Address TDS 162 (FIG. 1D) that can be used to pickle/unpickle the object. A flags field may indicate, for example, if inheritance is supported. The TDO has two additional pointers: one pointer is to a two-byte status of data for embedded attributes indicates whether or not the data is null and if null then the next pointer need not be used; another pointer is to a list of TDOs, and in this example the first element in the list is a pointer to the Street TDO, the next element is a pointer to the City TDO, the next element is a pointer to the Zip code TDO and the last element is a pointer to the State TDO.

One type of ADT is a User Picklable Type (UPT). A UPT is a collection of information that allows an application to store in an image form (e.g. binary), any data type that is not a natively-supported type. Examples of UPTs include non-final ADTs, nested tables or varrays. When an attribute of the ADT is a UPT, in one example, one of four special opcodes is used. The four opcodes indicate whether the attribute is a table to be pickled inline; a table to be pickled out-of-line; a varray to be pickled inline; or a varray to be pickled out-of-line. The opcode to be used for a UPT may be selected or declared by an application program at the time an ADT is declared. When an attribute of the ADT is complex, such as a UPT or a nested ADT that contains a UPT, a Collection opcode is stored in the metadata associated with the ADT. The Collection opcode indicates that a pickier should use collection images in writing the image as described in U.S. Pat. No. 6,128,621.

Note that Oracle 9i supports two flavors of ADTs: inline types and out-of-line types. Both of these are called user picklable types. Inlined types are created without the "NOT FINAL" clause meaning that they cannot be used to derive other types. Out-of-line ones are created using the "NOT FINAL" clause. Collection and nested tables are also user picklable types.

In response to "create type" command 112, a prior art computer 100 generates a Type Descriptor Segment "TDS" 162 for Person ADT as shown in FIG. 1D (note that another TDS 161 was previously generated in response to command 111 and a copy of it is included in TDS 162 as discussed next). As illustrated in FIG. 1D, a Type Descriptor Segment 161 for embedded ADT is provided contiguously within Type Descriptor Segment 162 just before index definition at the end of Type Descriptor Segment 162, with an offset 163 provided in a location 164 that is in-line within TDS 162, specifically at the same location where the attribute would have been present if the attribute were native to computer 100. Offset 163 of a prior art TDS has a value that identifies a location that is within current description 122, typically a location that occurs just before an index definition within current description 122. Such offsets that point to locations within the same TDS that contains the offset, are referred to herein as "internal" offsets. All offsets used in prior art known to the inventors are internal offsets, which was done to ensure that each TDS is self-contained, thereby allowing the TDS to be copied to another computer or saved to disk, without concern that pointers (if used) become invalid on doing so.

When programmer 101 defines additional ADTs such as an ADT 113 called "Employee" that uses person ADT 112, the TDS that is automatically generated by computer 100 for storage in the database ORACLE is shown in FIG. 1E. Although ADT 113 is illustrated in FIG. 1A as being specified by programmer 101 to have only one attribute (i.e. the person ADT), the programmer may easily specify additional attributes such as Employee Identifier and/or Employee Salary (both of which may be integers).

In the example of FIG. 1A, programmer 101 also issues a command 114 for an ADT called "Manager" that uses person ADT twice, once to hold information about an individual who is a manager himself (or herself) and another time to hold information about employees that report to this manager. A TDS shown in FIG. 1F is automatically generated, e.g. by a type manager in the database system, from ADT create type command 114 (shown in FIG. 1A). Moreover, programmer 101 may define further ADTs such as ADT 115 called "CEO" that uses person ADT 112 three times as follows: once to hold information about the CEO himself (or herself) and two times as noted above to hold information about managers that report to the CEO. The TDS that is automatically generated from ADT 115 is shown in FIG. 1G.

The inventors (of this current patent application) note that there is redundancy in a prior art TDS that is generated by the above-described prior art method(s), as follows. The description of "Address UPT" is repeatedly embedded at three different levels, as shown in italics in FIG. 1G. The inventors note that the size of a TDS of an ADT that contains embedded ADTs can be reduced, if multiple embedded TDSs that are redundantly present at the different levels are eliminated, as discussed next.

SUMMARY

When programmed in accordance with the invention, a computer automatically identifies all occurrences of each abstract data type that is embedded within metadata of an abstract data type (hereinafter "top-level" abstract data type), e.g. by recursively visiting each attribute of each abstract data type (ADT). Next, the programmed computer automatically generates, for the top-level abstract data type, a top-level description that contains a description (called "shell" description) of an embedded abstract data type at one or more locations that correspond to one or more occurrences of the embedded abstract data type in the top-level abstract data type. The shell description of a given embedded abstract data type contains an offset that identifies a position of a description of the given embedded abstract data type (also called "full" description). The just-described offset within a shell description identifies a position that is outside of the shell description that is being generated, and for this reason is hereinafter referred to as an "external" offset. Note that an external offset is still an "offset" (i.e. not a pointer) in the sense that the external offset identifies a relative position in a higher-level description within which the shell description is contained (e.g. relative to the offset's own position in the description or relative to a beginning (or end) of the higher-level description).

Most descriptions in accordance with the invention contain, for each abstract data type referred to therein, at least one full description, and it is the full description that is referred to by multiple offsets (either internal or external) to avoid additional full descriptions of the same abstract data type. Hence, use of multiple offsets each of which identify the same full description of metadata of an embedded abstract data type reduces space. The space reduced was otherwise occupied by multiple copies of the full description (as is presently done in all of the prior art known to the inventors). Use of "external" offsets that point to positions external to a shell description allows a full description to be shared across multiple levels of abstraction, to further eliminate redundancy.

In some embodiments that prepare a description in the form of a type descriptor segment (TDS), the computer is programmed to include, in a top-level TDS, only one TDS (also called "full" TDS), and a number of "shell" TDSs that contain external offsets pointing to the full TDS. The shell TDSs are not individually self-contained because the external offsets therein must be traversed to find the full TDS which is positioned elsewhere in a higher-level TDS (i.e. lower-depth TDS). However, the shell TDSs as well as the full TDS are all included in a higher-level TDS, and therefore traversing the external offsets can be performed in the normal manner, even after the higher-level TDS has been transferred to another computer or to nonvolatile storage. In some embodiments, multiple shell TDSs identify a single full TDS, regardless of the number of times the ADT (described by the single TDS) occurs, and regardless of the level (or depth) at which it is embedded. And in some of these embodiments, positioning of each single full TDS of each embedded ADT is performed according to a predetermined convention, e.g. the full TDS is positioned at the end (or the beginning) of the top-level TDS in which an offset occurs.

Inventors expressly contemplate alternative embodiments that may be suboptimal in some respects, as compared to embodiments described in the previous paragraph. One such embodiment uses two full TDSs of a given embedded ADT, with a certain number (e.g. one half of the total number) of offsets identifying one full TDS, and the remainder (e.g. other half of offsets) identifying the other full TDS. Another such embodiment may use offsets for only one half of the total number of occurrences of an embedded ADT, and embed full TDSs for the other half of occurrences. Also, although some embodiments use recursion to visit various nodes of a tree representation of a top-level ADT, other embodiments use non recursive methods to perform such traversal.

Numerous such modifications and adaptations of the embodiments described herein will be apparent to the skilled artisan in view of this disclosure.

BRIEF DESCRIPTION OF THE FIGURES

FIG. 1C illustrates, in a block diagram, internal structure of a Type Descriptor Object (TDO) of the prior art.

FIGS. 1D-1F illustrate prior art TDSs that are created by computer 100 in response to create type commands shown in FIG. 1A.

FIGS. 1G1 and 1G2 are a top portion and a bottom portion respectively of a prior art TDS.

FIG. 1G is a key for combining FIGS. 1G1 and 1G2 into a single FIGURE illustrating the prior art TDS.

FIG. 2A illustrates, in a flow chart, acts performed in some embodiments of a computer that is programmed in accordance with the invention.

FIG. 2B illustrates a top-level TDS 203, prepared by use of the acts of FIG. 2A to include shell TDSs 204 and 205 containing offsets 208 and 209, which occupies less space in memory 506 (FIG. 5A) to describe the same abstract data types (ADTs) defined by programmer 101 of FIG. 1A.

FIG. 3A illustrates, in a flow chart, an embodiment that uses recursion in performing the acts of FIG. 2A.

FIGS. 3C-3F illustrate shell TDSs that are created and used in accordance with the invention.

FIG. 4F illustrates, in a flow chart, the illustrative implementation that generates the data structures in FIGS. 4A-4E.

DETAILED DESCRIPTION

In accordance with the invention, a computer of the type shown in FIGS. 5A and 5B (described below) receives as input an object (hereinafter "top level" object) containing metadata of an abstract data type (hereinafter "top level" abstract data type) at the highest level of abstraction, and a number of additional objects containing metadata of additional abstract data types that are embedded in the top-level abstract data type (and hence at lower levels of abstraction).

Such a computer is programmed, in some embodiments of the invention, to perform act 201 (FIG. 2A) to automatically identify one or more embedded abstract data types in the top-level abstract data type that occur multiple times, regardless of the level at which embedded. Referring to the example illustrated in FIG. 1A, such a computer identifies the Person ADT (as occurring multiple times). The specific steps that may be performed by the computer to identify such multiple occurring ADTs may be different, in different embodiments.

Depending on the embodiment, the computer may determine, in act 201, not only the identity of such an ADT but also the number of times that this identified ADT occurs in the entirety of a top-level ADT. Some embodiments identify all ADTs within the top-level ADT, and generate a count of each time that each ADT occurs. For example such computers may determine that the CEO ADT occurs once (which is the top-level ADT), Manager ADT occurs once, Employee ADT occurs once, Person ADT occurs three times (once in each of the afore-said ADTs) and Address ADT also occurs three times (due to being embedded in Person ADT). Other embodiments identify all ADTs within the top-level ADT, but do not necessarily count each time each ADT occurs. In the just-described example, such other embodiments count the Address ADT only once (the first time it is encountered), but do not count it again any further during the times that Address ADT is embedded within Person ADT. Note that the Address ADT is implicitly counted whenever Person ADT is counted.

The computer is further programmed, in accordance with the invention, to perform act 202 to automatically generate, for the top-level abstract data type, a top-level description that includes a description of an embedded abstract data type (hereinafter "shell description") that is incomplete (i.e. missing the metadata which describes its attributes), but containing an offset to a common position at which the missing description (of the embedded ADT's attributes) is present. The common position may be at, for example, the beginning or end of the top-level description, depending on the embodiment. Each shell description and its offset is located in the top-level description in correspondence with an occurrence of the embedded abstract data type in the top-level abstract data type.

Figure 1A:
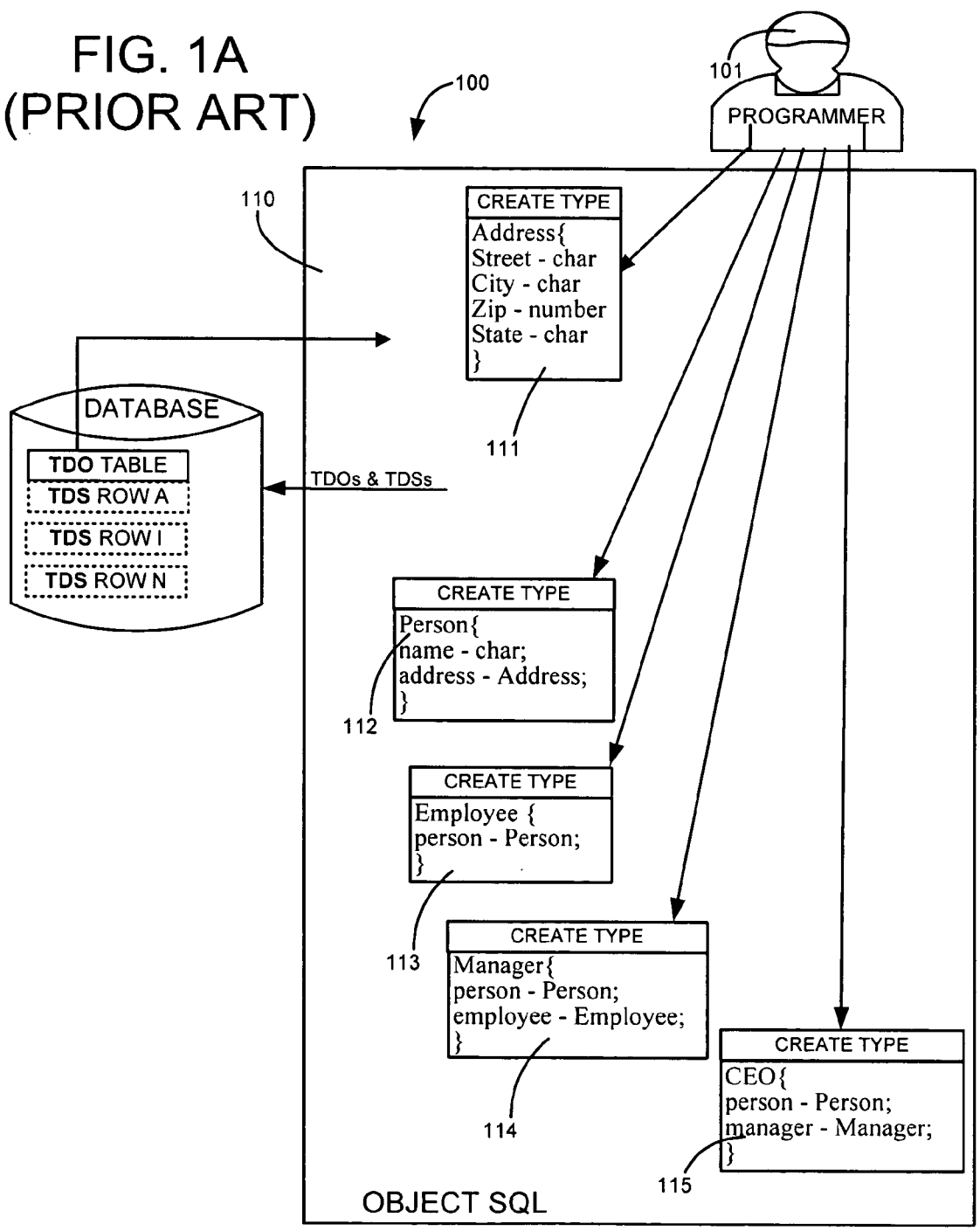
FIG. 1A illustrates, in a block diagram, a computer 100 of the prior art which is programmed with an object SQL interface in a database system, that accepts "create type" commands from a programmer 101 and in response prepares type descriptor objects (TDOs) that contain type descriptor segments (TDS), to be stored in a database as tables and rows respectively.

Referring to the example of FIG. 1A, the top-level description 203 illustrated in FIG. 2B is generated by some embodiments of a computer on performance of act 202. Specifically, top level description 203 for CEO ADT contains an embedded description 206 for the Person ADT that is located at its end. A common position 210 of the beginning of this embedded description 206 is identified by each of offsets 207, 208 and 209 as illustrated in FIG. 2A. Note that the offsets 207-209 are located at specific locations within top-level description 203 which are immediately after "Start ADT" in each of the respective embedded descriptions 203, 204 and 205, which is in correspondence with occurrences of their ADTs.

Use of multiple external offsets that identify the same position of a full description results in a sharing of the full description as described above. Such sharing results in a reduced size of the top-level description as compared to prior art top level descriptions that contain multiple copies of embedded descriptions at the same or multiple levels of nesting. FIG. 2A illustrates the use of two external offsets 208 and 209 that commonly share the same embedded description 206 thereby to eliminate two additional copies of this description that are otherwise present in the prior art top-level description shown in FIG. 1E. Note that each of the descriptions 203-206 may contain one or more additional offsets (such as offsets 207, 211, 212 and 213) that point to internal positions in the normal manner.

Note that in some embodiments the, above-described offsets (both internal and external) are self-referential, meaning the offsets identify in units of memory (such as bytes or words) a distance that is measured from a current location (of the offset) in the positive direction (i.e. in order of increasing memory addresses). In alternative embodiments, such offsets may be implemented in other ways, e.g. as a distance relative to a beginning (or end) of a top-level description.

Moreover, in some embodiments, a top-level TDS (as shown in FIG. 2B) is prepared, by an appropriately programmed computer, to contain only a single full TDS of each embedded abstract data type, regardless of the number of times and the level of nesting at which the embedded abstract data type occurs in the top-level abstract data type. In such embodiments, at each location in a top-level TDS that corresponds to an occurrence of an embedded abstract data type in the top level abstract data type, the computer inserts an offset internal to the top-level TDS that identifies the position of the single TDS of that embedded abstract data type (relative to the current location). Use of a single embedded description provides the most compact size of a top-level description although sub-optimal embodiments are also contemplated by the inventors.

Figure 3B:
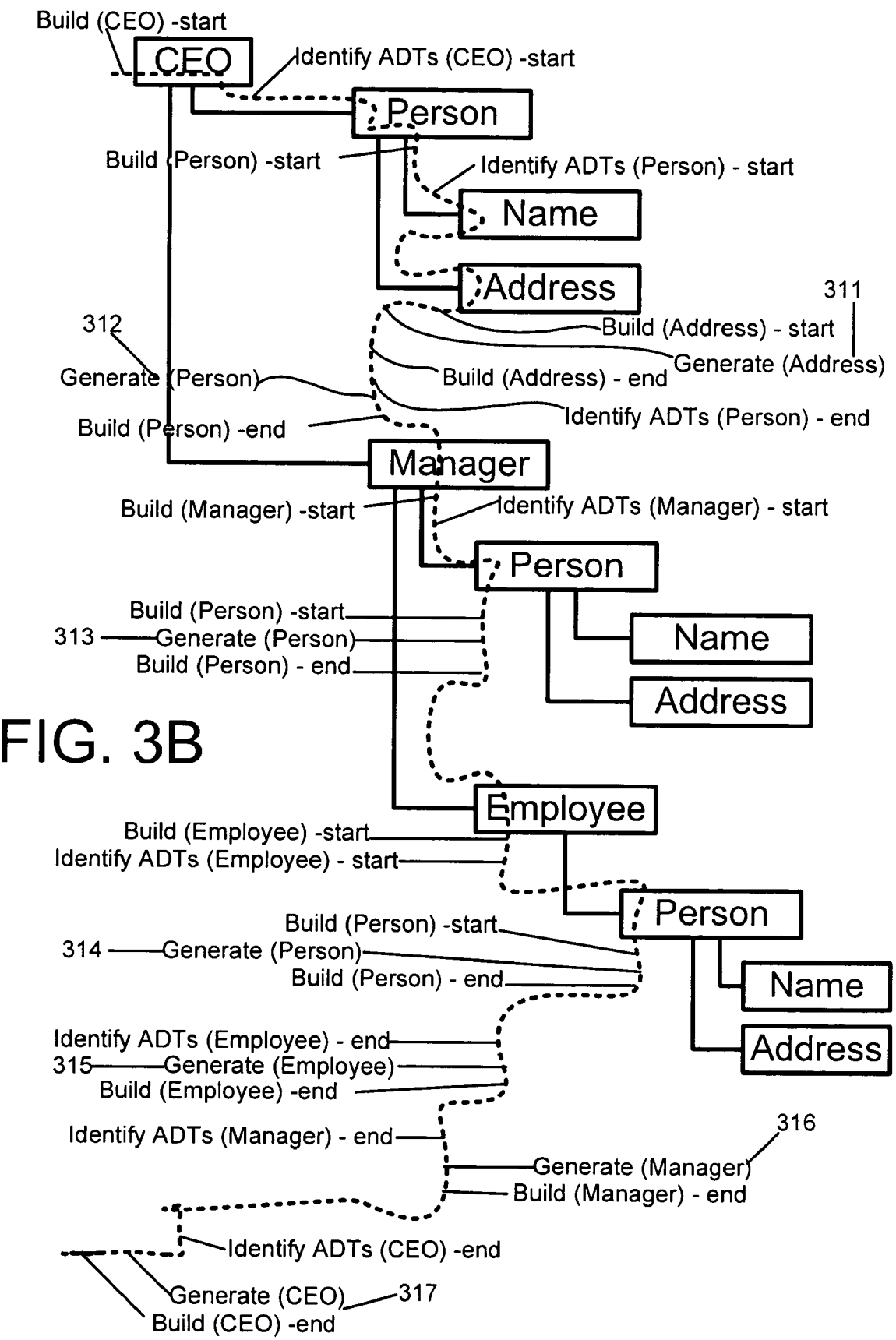
FIG. 3B illustrates, in a block diagram, traversal of an in-memory representation of the top-level abstract data type for a "CEO" as defined by programmer 101, when performing the acts of FIG. 3A.

In some embodiments in accordance with the invention a computer is programmed to perform acts 301-304 illustrated in FIG. 3A to recursively traverse a tree representation of a top-level abstract data type (ADT) in a memory 506 (FIG. 5A), as illustrated in FIG. 3B for the example of FIG. 1A. Such a tree representation of the CEO TDO 125 includes embedded TDOs for Address, Person, Employees and Manager connected in a hierarchy, is typically prepared by a user interface that interprets "create type" commands illustrated in FIG. 1A. Specifically, a function called "BUILD" is invoked by the programmed computer with the top-level metadata object (for example CEO TDO) as an argument thereof. In the example illustrated in FIG. 3A, act 301 of the BUILD function checks if this current metadata object has been previously visited and if not goes to act 302 to invoke another function called "IDENTIFY ADTs"

In act 302, the computer performs two acts 302A and 302B while visiting all of the attributes in the current metadata object. If all attribute are supported natively in the computer, then the computer is programmed to go to act 304. If not natively supported, then the computer marks the attribute as being new or previously encountered (e.g. keeps a count of the number of occurrences of each embedded ADT) as per act 302A, and invokes the BUILD function in act 302B, to process the embedded ADT recursively via branch 303A. Specifically, when transitioning to the BUILD function, the computer passes as argument an attribute in the current metadata object that is not natively supported, and act 301 in FIG. 3A is entered. Within the just-described recursive call to the BUILD function (i.e. at the lower level of abstraction), if the just-described attribute was previously encountered, then the "Yes" branch is taken out of act 301 into act 304 and a shell TDS is generated by act 304. Otherwise, when act 304 is entered from act 302B (i.e. on completion of act 302), a full TDS is generated in the normal manner (which is non-shell).

After generation of a TDS in act 304 of the method shown in FIG. 3A, control returns to act 302B, and if there are any unvisited attributes then act 302A is again executed via branch 303B. Hence, the computer is programmed (in act 302) to check if all embedded ADTs in the current metadata object have been visited and if not then each unvisited attribute is used in turn to perform acts 302A and 302B (i.e. repetitively mark and invoke BUILD). On completion of act 302 if there are no unvisited attributes, the computer goes to act 304 to invoke a function called "GENERATE". As noted above, if all attributes of a current metadata object are found in act 302 to be natively supported then also the computer goes to act 304 to invoke the function GENERATE. The function GENERATE is also invoked from act 301 if the current metadata object was previously visited.

Function GENERATE prepares either a full description (in the form of a normal TDS) of the current metadata object (containing internal offsets of the type shown in FIGS. 1D, 1E and 1F), or a shell description including space for an external offset that is to be patched later (in the form of a "shell" TDS). The type of description that is prepared depends on whether or not the current metadata object was previously encountered (e.g. if the current number of occurrences is 1 then a full description is generated else a shell description is generated). A shell description is similar to a full description except that instead of describing one or more attribute(s), a corresponding number of external offsets (or space required thereof) are provided therein, at the same locations as descriptions of the attributes would have otherwise been provided. Note that this shell description prepared by Function GENERATE differs from the prior art descriptions by using external offsets.

For example, in FIG. 2A, TDS 205 is an illustration of a shell TDS whereas TDS 206 is an illustration of a full TDS. In this example, note that shell TDS 205 not only lacks the TDS of Person embedded therein, but contains an external offset 209 to Person TDS 206. Moreover, in the example of FIG. 2A, the Manager TDS 204 is a shell TDS that also contains an external offset 208 to Person TDS 206. On the other hand, Person TDS 206 is a full TDS which contains a full TDS 216 for Address. This example illustrates two shell TDSs 204 and 205 containing external offsets that identify a single full TDS 206, thereby to avoid redundant TDS descriptions. Moreover, CEO TDS 203 is also a full TDS because it contains all its TDSs fully defined internally to itself. Specifically, the just-described single full TDS 206 is also referred to internally by offset 207 in top-level TDS 203.

One illustrative embodiment for performing function GENERATE is illustrated by acts 305-308 which are discussed briefly next, wherein a metadata object is represented by a Type Definition Object (TDO). Specifically, in act 305, the computer is programmed to check if the current TDO was previously encountered, and if so it generates a shell TDS and an identifier of a specific location of an offset in the shell TDS that is to be patched later (when a higher-level TDS is prepared). If the current TDO was not previously encountered, in act 306, the computer is programmed to check if all attributes are natively supported and if so then it generates a full TDS. If the current TDO was not previously encountered, and if one or more attributes are not natively supported, i.e. they are embedded TDOs, then the computer is programmed to generate a shell TDS by copying previously-generated TDSs.

These previously-generated TDSs may be themselves either shell or full, depending on the number of occurrences.

Recursive operation, of the three functions BUILD, IDENTIFY ADTs and GENERATE shown in FIG. 3A, is illustrated in detail by an unlabeled dashed line in FIG. 3B (which represents an execution thread). In this execution thread, initially BUILD is invoked with the TDO for CEO, followed by IDENTIFY ADTs for the CEO TDO (see act 302 in FIG. 3A). Then, in act 302, the CEO TDO is found to contain attributes that are not native and hence BUILD is invoked recursively, with Person TDO as the argument. Within this execution of the BUILD function, act 302 is performed to IDENTIFY ADTs of Person TDO, which are found to be Name and Address (see FIG. 3B). Next, on finding Address to be a non-native type, function BUILD is invoked again in act 302, this time with Address TDO as the argument. Next, IDENTIFY ADTs is invoked in act 302 with Address TDO as the argument, and its attributes Street, City, Zip and State are found to be native types and hence control transfers directly to act 304 (i.e. no need to invoke BUILD for any of these attributes—because leaf nodes have been reached during the depth first search). At this stage during execution of GENERATE, in act 304, a full TDS (which is identical to TDS 216 in FIG. 2B except that it is independent and not contained in any TDS) is generated, as per act 306 because all its attributes are natively supported. Note that this is the very first TDS that is generated.

At the end of this act 304, execution of BUILD for the Address TDO is now completed, and control returns to the previous level which is in the process of visiting all attributes of the Person TDO in act 302B. At this stage, if there were unvisited attributes, control would return from act 302B to 302A. But since in this example there are no unvisited attributes (i.e. both Name and Address have been visited), act 302 is completed for Person TDO, and control transfers to act 304 to invoke the GENERATE function for Person. At this point 312 in the execution thread (FIG. 3B), act 307 is now performed to generate a full TDS 206 for the Person TDO. Note that in act 307 a copy of the full TDS for Address (as mentioned at the end of the previous paragraph) is made, into full TDS 206 (FIG. 2B) for Person (this copy is shown as Address TDS 216) and any offsets in these TDSs are now updated. Note that the previously-generated full TDS for Address, as described at the end of the previous paragraph, may now be discarded (and any allocated memory thereof released) because it is no longer required (since full TDS 206 for Person now contains full TDS 216 for Address). At this stage, execution of function BUILD for Person TDO is complete, and control returns to act 302B of the previous level, wherein any additional attributes of the CEO's TDO are visited.

At this point, the CEO's TDO contains the Manager attribute which is still unvisited and so function BUILD is invoked in act 302B with the Manager TDO as argument. Since the Manager TDO was not previously visited, act 302 is performed to invoke IDENTIFY ADTs to find non-native attributes within the Manager TDO. The first TDO that is encountered within Manager TDO is of Person, and hence function BUILD is invoked with the Person TDO. In act 301 during this execution of the BUILD function, Person TDO is found to have been previously encountered, and so act 304 is directly performed to invoke GENERATE with the Person TDO (i.e. act 302 is not performed). At this point 313 in the execution thread (FIG. 3B), a shell TDS 323 (FIG. 3C) is generated for the Person TDO (because this Person TDO was previously encountered) as per act 305 (FIG. 3A). Note that shell TDS 323 contains a location 323E for an external offset that is initially (at this stage) set to null, and which is to be patched later (during assembly of a higher-level TDS) to identify the location of the corresponding full TDS 206 for Person (FIG. 2B).

After shell TDS 323 is generated, function BUILD is completed, and control returns to a previous level in act 302B, and any unvisited attributes of the Manager TDO are processed by returning to act 302A. Specifically, in this example, the attribute Employee of the Manager TDO is found to be a non-native type and hence BUILD is again invoked with Employee TDO. Since Employee TDO has not been previously visited, execution proceeds from act 301 to act 302, to IDENTIFY ADTs within Employee TDO. Next, in act 302B, function BUILD is invoked with the Person TDO, and in act 301 this TDO is found to have been previously encountered and execution proceeds to act 304 to invoke GENERATE. At this point 314 (FIG. 3B) during execution, another shell TDS 324 is generated for the Person TDO (see FIG. 3D). Note that shell TDS 324 is identical, in all respects, to shell TDS 323, which is described above.

At this stage, after generation of shell TDS 324 (FIG. 3D) the function BUILD for Person TDO is completed, and execution returns to act 302B (FIG. 3A) to process any further attributes of Employee TDO, and in this example since there are no more attributes, function IDENTIFY ADTs is now completed for the Employee TDO, and so act 304 is now performed to generate a TDS for the Employee TDO. In some embodiments, at point 315 (FIG. 3B) during execution, a shell TDS 315 is generated for the Employee TDO by executing act 307 (FIG. 3A), with a location for an external offset to a full Person TDS. As noted below, this location is patched later to point to a full Person TDS in the highest-level TDS that has Person as its attribute, which in this example happens to be CEO TDS. Note that if in the example, the CEO TDO did not contain a Person TDO, then the Manager TDO is the highest-level TDO, and hence the Manager TDS is prepared with the full Person TDS. Note further that in alternative embodiments, a full TDS may be prepared for the Employee TDO, and all offsets within the higher-level TDSs may be patched to identify this full TDS.

At point 315 (FIG. 3B), after generation of shell TDS 325 (FIG. 3E), the function BUILD for Employee TDO is completed, and execution returns to act 302B (FIG. 3A) to process any further attributes of Manager TDO, and in this example since there are no more attributes, function IDENTIFY ADTs is now completed for the Manager TDO, and so act 304 is now performed to generate a TDS for the Manager TDO. In some embodiments, at point 316 (FIG. 3B) during execution, a shell TDS 326 (FIG. 3F) is generated for the Manager TDO by executing act 307 (FIG. 3A) with a location for an external offset to a full Person TDS. As noted below, this location is patched later to point to a full Person TDS in the CEO TDS that also has Person as its attribute. Note that after generating the location for external offset to the Person TDS, a location 3261 for an internal offset to an Employee TDS is generated, followed by copying of TDS 325, followed by index definitions for the Manager TDS. The just-described internal offset is patched in location 3261, based on the position of the internal copy of Employee TDS.

At point 316 (FIG. 3B), after generation of shell TDS 326 (FIG. 3F), the function BUILD for Manager TDO is completed, and execution returns to act 302B to process any further attributes of CEO TDO, and in this example since there are no more attributes, function IDENTIFY ADTs is now completed for the CEO TDO, and so act 304 is now performed to generate a TDS for the CEO TDO. As noted above, during generation of the CEO TDS (at point 317 shown in FIG. 3B), full Person TDS 206 is positioned at the very end, just before the index, by copying therein all information from a copy thereof which was prepared at point 312 (discussed above). Moreover, Manager TDS 326 is also copied into TDS 203, to form TDS 204. These two TDSs may be positioned in any order relative to one another, depending on the embodiment. In several embodiments that do not support negative offsets (e.g. if their offsets fields hold only unsigned integers), the order in which these two TDSs 204 and 206 are located in CEO TDS 203 is chosen based on the frequency of their occurrence (e.g. by positioning the most frequent TDS at the end, and in this case TDS 206 is located at the end).

At this stage, on completion of act 307, all internal offsets 207, 211-213 contain appropriate values but all external offsets remain to be patched. Hence act 308 (FIG. 3A) is performed, because the CEO TDO happens to be the top-level TDO. Specifically, all external offsets within the currently-generated TDS 203 are now patched one at a time, by inserting appropriate values therein, depending on the positions of the respective full TDSs within TDS 203. Note that in some embodiments, the to-be-patched locations of external offsets are obtained from a list that is prepared (and updated) whenever an external offset is used in preparing a shell TDS. In the example of FIG. 2B, in some embodiments that use self-referential offsets, two distances from the locations of external offsets 208 and 209 to a common position 210 at the beginning of TDS 206 are computed and these two distances are stored as the values of external offsets 208 and 209. On completion of act 308, method of FIG. 3A is completed, and hence TDS 203 shown in FIG. 2B is now complete. This TDS 203 is now ready for storage to disk and/or transmission to another computer. Although certain specific acts are described above and illustrated in FIGS. 3A-3F, other similar acts (which are not necessarily recursive) may be used to prepare a top-level TDS 203 containing multiple external offsets that identify a single full TDS included therein, as would be apparent to the skilled artisan in view of the disclosure.

As noted above, in some embodiments of act 302 each embedded TDO in a top-level TDO is found by traversing an entire tree (dynamically stored in volatile memory) up to its leaf nodes, and in such embodiments, a count may be maintained of the number of occurrences of each embedded TDO. In other embodiments of act 302, an optimization is made as follows—if an embedded TDO that is currently encountered is a duplicate of a previously encountered TDO then the currently encountered embedded TDO is not further processed (i.e. its attributes are not used to recursively invoke the function BUILD). Therefore, when such embodiments traverse the top-level TDO for CEO in the example of FIG. 1A, the TDO for Address ADT is encountered only once, and hence it is counted only once, although it occurs three times as shown in FIG. 3B. Note that in such optimized embodiments, all Address TDOs are implicitly counted, by virtue of being embedded in multiple Person TDOs.

Figure 4A:
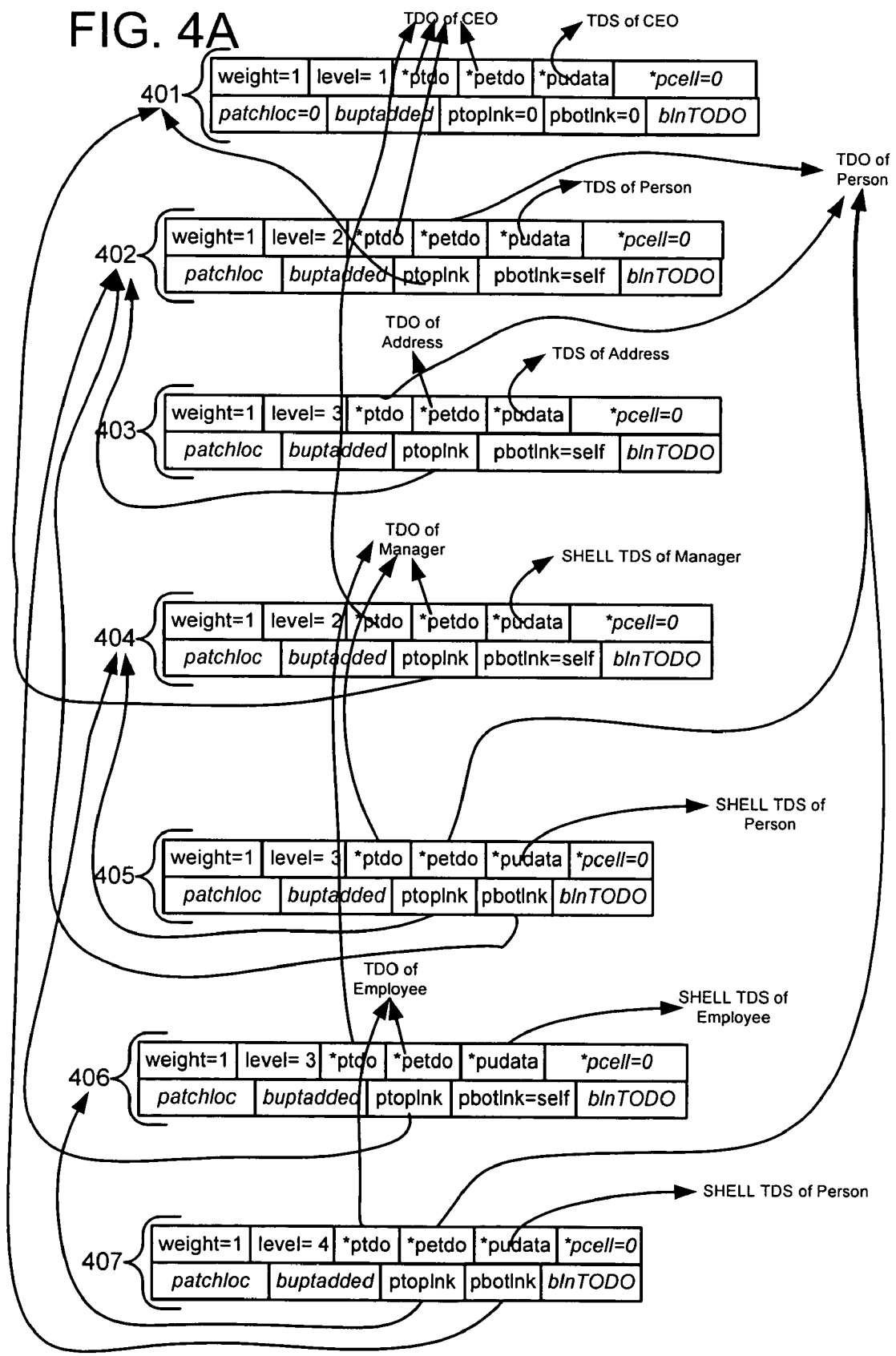
FIGS. 4A-4E illustrate data structures that are generated by one illustrative implementation of the embodiment of FIG. 3A.

During execution of act 302 to perform the function IDENTIFY ADTs, different embodiments of the computer are programmed to identify multiple occurrences of embedded TDOs using different data structures that depend on the embodiment (e.g. via a list of redundant occurrences for each TDO or via a flag at each node of a tree in FIG. 3B or a combination thereof). Some illustrative embodiments prepare data 401-407, which is shown in FIG. 4A for the example illustrated in FIG. 1A. Data 401 is also referred to as "type cell" in the following description, and this same data is referred to as "udata_cell" in Appendix A below. Referring to FIG. 4A, act 302 of these illustrative embodiments prepares a type cell whenever an embedded type is encountered, regardless of whether or not that embedded type was previously encountered. For this reason, FIG. 4A shows three type cells 402, 405 and 407 for Person TDO.

Moreover, act 302A (FIG. 3A) of these embodiments marks two type cells 405 and 407 as being duplicates of type cell 402, e.g. by setting a pointer in field "pbotlink" in cells 405 and 407 to identify type cell 402. The type cell 402 that is being pointed to is the first type cell that was prepared for Person TDO, also referred to as a "base" type cell. Act 302 of these embodiments also maintains a "weight" field in the base type cell 402, to identify the number of times that an embedded TDO has been encountered. As noted above, at the end of the method of FIG. 3A in some embodiments, the weight field indicates the total number of occurrences of an embedded TDO, in a top-level TDO that is being traversed. In alternative embodiments the weight field indicates the number of times that each embedded TDO is encountered (which may be less than the number of occurrences, in case of the above-described optimized embodiments which do not count embedded TDOs in previously-encountered TDOs).

The type cell of several such embodiments also contains a pointer "ptoplnk" which identifies a type cell for a TDO (also called "parent TDO") in which a current TDO is embedded. In the example of FIG. 1A, the "ptopink" for each of three Person TDOs points to a different parent TDO, depending on where the Person TDO occurs, as follows: in type cell 407 the field ptoplink points to type cell 406 (for Employee TDO), in type cell 405 the field ptoplink points to type cell 404 (for Manager TDO), and in type cell 402 the field ptoplink points to type cell 401 (for CEO TDO). The type cell of such embodiments also contains a pointer "ptdo" which identifies a TDO that holds metadata of the parent ADT. In the example of FIG. 1A, the "ptdo" for each of three Person TDOs points to three different parent TDOs (similar to the just-described "ptoplink"). For example, the "ptdo" link in type cell 407 points to the TDO of Employee. The type cell of some embodiments also contains a pointer "petdo" which identifies a TDO that holds metadata of the parent ADT. The type cell of several embodiments also contains a pointer called "pudata" which is eventually updated to identify a description in the form of a TDS when the TDS is generated. The generated TDS may be full (if it represents a base type cell which is true if the ADT has been encountered for the first time), or shell (if it represents a type cell that's previously encountered). The type cell may also contain a field "level" that indicates a current level of abstraction at which the type cell is generated.

In some embodiments, the type cell includes one or more fields that are not initialized by act 302 (FIG. 3A), and instead the fields are initialized in act 304. Examples of such fields are two pointers called patchloc, *pcell and a Boolean flag called blnTODO. These fields are discussed below in reference to Appendix B. Note that pcell field of a base type cell is initialized to point to a duplicate's type cell when the duplicate TDO is encountered. The pcell pointer in the duplicate type cell is initialized to point to yet another duplicate type cell when yet another duplicate TDO is encountered. This field *pcell is further described at line 31 in Appendix A.

Although FIG. 4A illustrates certain data that is prepared in some embodiments of act 302 for use by act 304, other embodiments may prepare other data to identify one or more TDOs that are redundantly embedded in a top-level TDO. Regardless of the manner in which the identification of embedded types is conveyed to the GENERATE function in act 304, certain embodiments prepare and use additional data, called "pointer structures" illustrated in FIG. 4B, and referred to in Appendices A and B as "kopttbc". The pointer structures are prepared for each attribute of a current TDO whose TDS is being prepared, and they include the following five fields: an opcode, arguments, location of a to-be-patched offset in a shell TDS of the attribute (called "tdsloc"), pointer to metadata describing the UPT (called *uptdata), and a Boolean flag called "is TDO_or_CELL" each of which is described briefly below and in further detail in Appendices A and B.

Figure 4B:
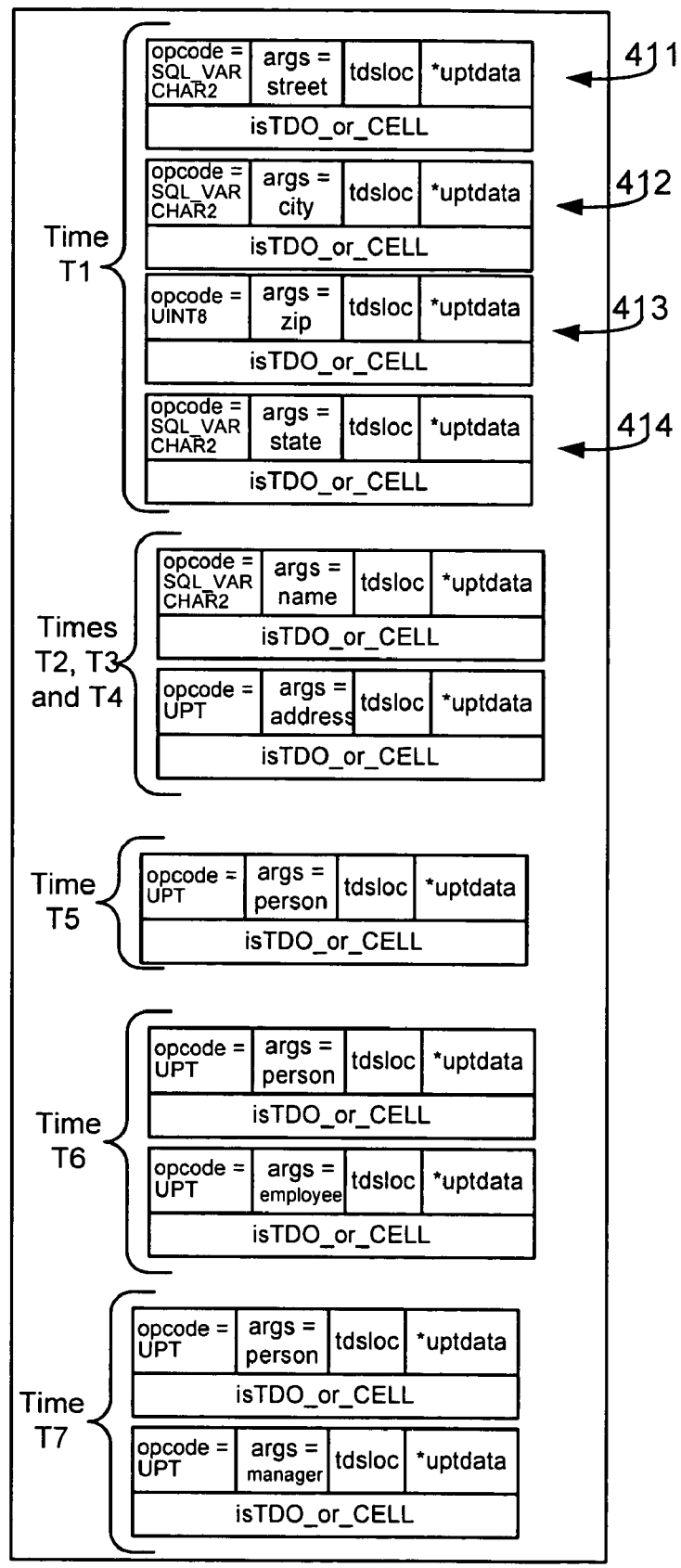

At a given moment in time T1, just before generation of the Address TDS during execution at point 311 (FIG. 3B) during execution, four pointer structures 411-414 are prepared by the function GENERATE of some embodiments, as shown in FIG. 4B, one for each of fields "Street", "City", "Zip" and "State" which are the four elements of the Address ADT. As illustrated by pointer structures 411-414, an opcode in each pointer structure is set to a predetermined value that indicates a specific native data type supported in this computer (e.g. SQL_VAR_CHAR2 or UINT) if the attribute is of that native data type, and alternatively a fixed value that indicates the attribute to be of a user defined type (e.g. UPT). Note that the opcodes may have different lengths, depending on their predetermined value (e.g. both SQL_VAR_CHAR2 and UPT have a length of 6 bytes whereas UINT has a length of 4 bytes). In case of UPT data type, the 1 byte opcode is followed by a 1 byte user code, followed by a 4-byte offset to the TDS. The 1-byte user code indicates whether the TDS belongs to a collection or ADT. The arguments within each pointer structure identify information about type, such as "precision" and "scale" in case of a number. In case of a UPT opcode, the arguments may identify another user defined type.

The Boolean is TDO_or_CELL is used to identify whether the *uptdata pointer identifies a TDO itself or if it identifies a type cell that in turn identifies the TDO. Note that the TDO is directly identified when a TDO is encountered for the first time, and on all subsequent encounters the type cell is identified.

Note that pointer structures 411-414 are elements of a dynamic array and they are destroyed and re-created as each TDS is created by function GENERATE of some embodiments. Hence, at times T2, T3 and T4, which are respectively shown in FIG. 4B as occurring just before TDS generation during the respective execution points 312, 313 and 314, two cells are repeatedly created (one for each of "name" and "address" which are attributes of the Person ADT). FIG. 4B also shows the pointer structures, at times T5, T6 and T7 which occur just before TDS generation during the respective execution points 315, 316 and 317.

Figures 4C, 4E:
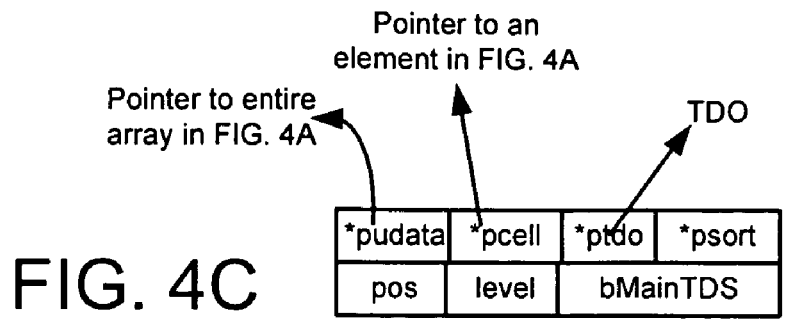

FIG. 4C illustrates context data called "udata_ctx" in Appendix B that is created on entry into the function GENERATE by some embodiments to hold scratch data. Specifically, a field *pudata points to a dynamic array formed by type cells shown in FIG. 4A, while another field *pcell points to an individual one of these type cells, and yet another field pos is used to index into the array of FIG. 4A. A field ptdo points to the TDO of the current metadata object that is used to invoke function GENERATE. A field "level" indicates the abstraction level of attributes that are to be included in the TDS being generated, while flag bMainTDS indicates whether or not the current level is the top level. Finally, a field *psort is null in case of TDOs that were not previously encountered, and this field points to a list of duplicate TDOs as discussed below in reference to FIG. 4E. Note that information in this context data gets overwritten (and hence memory is reused) each time that the function GENERATE is invoked, in some embodiments of the invention.

Figure 4D:

FIG. 4D illustrates, a structure that is used in some embodiments of the function GENERATE to identify the location of an external offset that is to be patched, and this structure is referred to below in Appendices A and B as "kopttodo". This structure has at least two fields, a first field is an index into the array of type cells (FIG. 4A), and a second field that indicates the location of an external offset in a shell TDS that needs to be updated. A number of these structures are prepared into a "todo" list, as described below in Appendices A and B.

FIG. 4E illustrates a sorted list that is prepared in some embodiments of function GENERATE. Each element of the sorted list contains four fields, namely the above-described level, weight, *pcell and pos. Values of all fields of each element in the sorted list are shown in FIG. 4E for the above-described example, at a moment just before TDS generation during execution at point 317. Note that sorting is done in some embodiments which cannot handle external negative offsets in the TDS. Specifically, the value of offsets 208 and 209 in FIG. 2B is negative, if the full TDS for the person UPT were to be located at a lower memory address than the current memory address of offset 207 (as a first example, if instead of location 207 containing an internal offset as shown in FIG. 2B if the full TDS for person UPT were to be present there, or as a second example if the full TDS for person UPT were to be present immediately after the End ADT of the CEO TDS as shown in the top portion of FIG. 1G1). Such negative offsets are avoided if all the full TDSs are sorted by their frequency of reference (by offsets) within the top-level TDS regardless of the level of nesting. Hence, when sorted in this manner, the most commonly referenced TDS is located at the very end (of the top-level TDS) and therefore every offset which references this TDS will be positive. Similarly the offsets of all the remaining TDSs are made positive by sorting that is performed in certain embodiments.

In some illustrative embodiments, function GENERATE is implemented by acts 494-499 illustrated in FIG. 4F, as described briefly below and in greater detail in Appendices A and B. Specifically, in act 494, the computer is programmed, for each attribute of the current metadata object, to create a pointer structure as follows depending on whether the attribute is a duplicate object: if duplicate object point to a "type" cell; if not duplicate object point to a previously-prepared TDS; if not an object (i.e. if object is of native type), point to null. Next, in act 495, the computer is programmed to calculate a total size of the TDS that is to be generated (e.g. by performing acts 496-498) but without any copying. During act 495, the computer is further programmed to allocate memory of the calculated size, followed by copying a header for the TDS into the allocated memory. As noted elsewhere, the header consists of a 4 byte-length, version, prefix segment and flags. Note that the length field is not initialized at this time, and instead this field is filled in later in act 499 after generation of the top-level TDS is complete, except for length.

Next, in act 496, the computer is programmed to process a list of pointer structures for attributes as follows: if the attribute is a metadata object, copy into allocated memory, opcode and arguments for this type, create an identifier of an external offset and identify a location in allocated memory where the external offset is to be stored (e.g. as an element of the TODO list which is described elsewhere herein); if attribute is natively supported, copy into allocated memory the opcode and arguments. Thereafter, in act 497, the computer is programmed to reverse list of TODO elements (which is done to avoid creation of negative values for the external offsets), and to process the reversed list as follows: if attribute is a duplicate set flag to indicate part of TODO processing if attribute is non-duplicate, patch the offset in allocated memory, from the previously-prepared TDS. Next, in act 498, the computer is programmed to check if current level is top-level, and if duplicates are present. If both conditions are true then the list of duplicates is sorted (as shown in FIG. 4E), and then starting with last element in sorted list, for every element if number of occurrences is more than 1, the location of TDS is obtained, and location of external offset to be patched is obtained, followed by computing their relative distance (from one another), and the computed value is inserted into the external offset (i.e. the offset is patched). After act 498 (regardless of whether or not top-level and duplicates present), act 499 is performed to update the length in the header of the TDS.

Many embodiments of the invention use a computer system 500 of the type illustrated in FIGS. 5A and 5B which is discussed next. Specifically, computer system 500 includes a bus 502 (FIG. 5A) or other communication mechanism for communicating information, and a processor 505 coupled with bus 502 for processing information. Computer system 500 also includes a main memory 506, such as a random access memory (RAM) or other dynamic storage device, coupled to bus 502 for storing information and instructions (e.g. of the method in FIG. 2A or FIG. 3A) to be executed by processor 505. Memory 506 also holds one or more temporary TDSs (e.g. TDSs 323-326 in FIGS. 3C-3F) generated during execution of such instructions.

Main memory 506 also may be used for storing temporary variables or other intermediate information (e.g. type cells of FIG. 4A, pointer structures of FIG. 4B, and context data of FIG. 4C) during execution of instructions (FIG. 2A or FIG. 3A) by processor 505. Computer system 500 further includes a read only memory (ROM) 508 or other static storage device coupled to bus 502 for storing static information and instructions for processor 505. A storage device 510, such as a magnetic disk or optical disk, is provided and coupled to bus 502 for storing information and instructions.

Computer system 500 may be coupled via bus 502 to a display 512, such as a cathode ray tube (CRT), for displaying information to a computer user. An input device 514, including alphanumeric and other keys, is coupled to bus 502 for communicating information and command selections to processor 505. Another type of user input device is cursor control 516, such as a mouse, a trackball, or cursor direction keys for communicating direction information and command selections to processor 505 and for controlling cursor movement on display 512. This input device typically has two degrees of freedom in two axes, a first axis (e.g., x) and a second axis (e.g., y), that allows the device to specify positions in a plane.

As described elsewhere herein, automated database patching is provided by computer system 500 in response to processor 505 executing one or more sequences of one or more instructions contained in main memory 506. Such instructions may be read into main memory 506 from another computer-readable medium, such as storage device 510. Execution of the sequences of instructions contained in main memory 506 causes processor 505 to perform the process steps described herein. In alternative embodiments, hard-wired circuitry may be used in place of or in combination with software instructions to implement the invention. Thus, embodiments of the invention are not limited to any specific combination of hardware circuitry and software.

The term "computer-readable medium" as used herein refers to any medium that participates in providing instructions to processor 505 for execution. Such a medium may take many forms, including but not limited to, non-volatile media, volatile media, and transmission media. Non-volatile media includes, for example, optical or magnetic disks, such as storage device 510. Volatile media includes dynamic memory, such as main memory 506. Transmission media includes coaxial cables, copper wire and fiber optics, including the wires that comprise bus 502. Transmission media can also take the form of acoustic or light waves, such as those generated during radio-wave and infra-red data communications.

Common forms of computer-readable media include, for example, a floppy disk, a flexible disk, hard disk, magnetic tape, or any other magnetic medium, a CD-ROM, any other optical medium, punch cards, paper tape, any other physical medium with patterns of holes, a RAM, a PROM, and EPROM, a FLASH-EPROM, any other memory chip or cartridge, a carrier wave as described hereinafter, or any other medium from which a computer can read.

Various forms of computer readable media may be involved in carrying one or more sequences of one or more instructions to processor 505 for execution. For example, the instructions may initially be carried on a magnetic disk of a remote computer. The remote computer can load the instructions into its dynamic memory and send the instructions over a telephone line using a modem. A modem local to computer system 500 can receive the data on the telephone line and use an infra-red transmitter to convert the data to an infra-red signal. An infra-red detector can receive the data carried in the infra-red signal and appropriate circuitry can place the data on bus 502. Bus 502 carries the data to main memory 506, from which processor 505 retrieves and executes the instructions. The instructions received by main memory 506 may optionally be stored on storage device 510 either before or after execution by processor 505.

Computer system 500 also includes a communication interface 515 coupled to bus 502. Communication interface 515 provides a two-way data communication coupling to a network link 520 that is connected to a local network 522. Local network 522 may interconnect multiple computers (as described above). For example, communication interface 518 may be an integrated services digital network (ISDN) card or a modem to provide a data communication connection to a corresponding type of telephone line. As another example, communication interface 515 may be a local area network (LAN) card to provide a data communication connection to a compatible LAN. Wireless links may also be implemented. In any such implementation, communication interface 515 sends and receives electrical, electromagnetic or optical signals that carry digital data streams representing various types of information.

Network link 520 typically provides data communication through one or more networks to other data devices. For example, network link 520 may provide a connection through local network 522 to a host computer 525 or to data equipment operated by an Internet Service Provider (ISP) 526. ISP 526 in turn provides data communication services through the world wide packet data communication network 528 now commonly referred to as the "Internet". Local network 522 and network 528 both use electrical, electromagnetic or optical signals that carry digital data streams. The signals through the various networks and the signals on network link 520 and through communication interface 518, which carry the digital data to and from computer system 500, are exemplary forms of carrier waves transporting the information.

Computer system 500 can send messages and receive data, including program code, through the network(s), network link 520 and communication interface 518. In the Internet example, a server 550 might transmit a description of a top-level abstract data type (describing additional abstract data types embedded therein) through Internet 528, ISP 526, local network 522 and communication interface 515. In accordance with the invention, one such description in the form of TDS 203 (FIG. 2B) has reduced memory size due to use of multiple offsets (at least one internal and one external) that identify a common location of an embedded TDS, as described herein. Such a top-level description may be used by processor 505 as it is received, and/or stored in storage device 510, or other non-volatile storage for later execution. In this manner, computer system 500 may also obtain the top-level description in the form of a carrier wave (e.g. from another computer over a network).

Figure 5A:
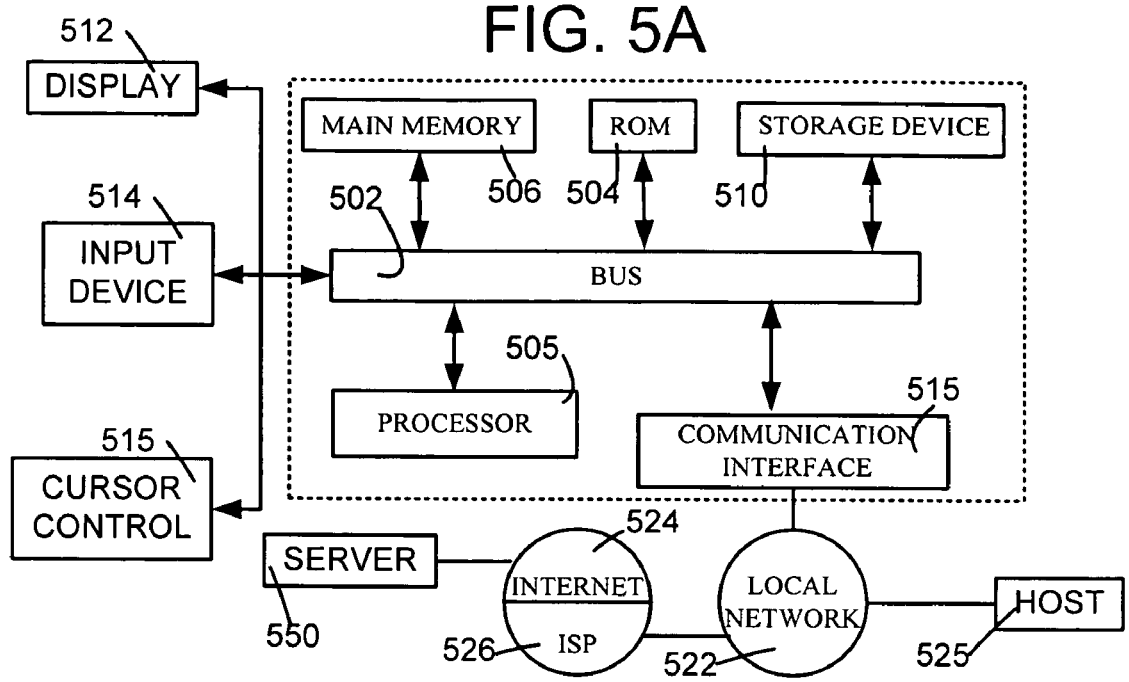
FIGS. 5A and 5B illustrate, in block diagrams, portions of a computer that is programmed to perform the method of FIG. 2A in some embodiments of the invention.
Figure 5B:
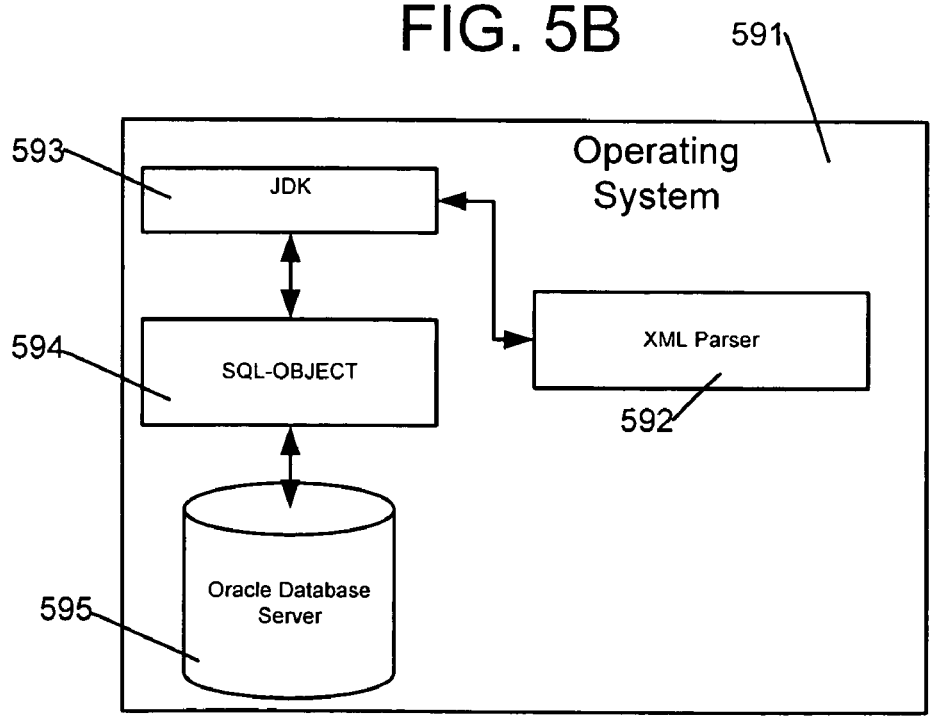

Note that FIG. 5A is a very low-level representation of many hardware components of a computer system. Several embodiments have one or more additional software components in main memory 506 as shown in FIG. 5B: Operating System 591 (e.g. Microsoft WINDOWS 2000), Database Server 595 (e.g. Oracle Server v9i2 for the source computer; e.g. Oracle Server v8i for the target computer), Java Development Kit 593 (e.g. JDK v118), Java XMLParser 592 (e.g. xmlparser available from Oracle Corporation), and JDBC drivers 594 (e.g. JDBC driver available from Oracle Corporation).

Note that the method illustrated in FIG. 2A can be used to compact any kind of metadata, such as XML types (e.g. "Start" and "End" markers and other XML tags, in a XML document). See XML Schema Part 0: Primer Second Edition, W3C Recommendation 28 Oct. 2004

Numerous modifications and adaptations of the embodiments described herein will become apparent to the skilled artisan in view of this disclosure.

Figure 1B:
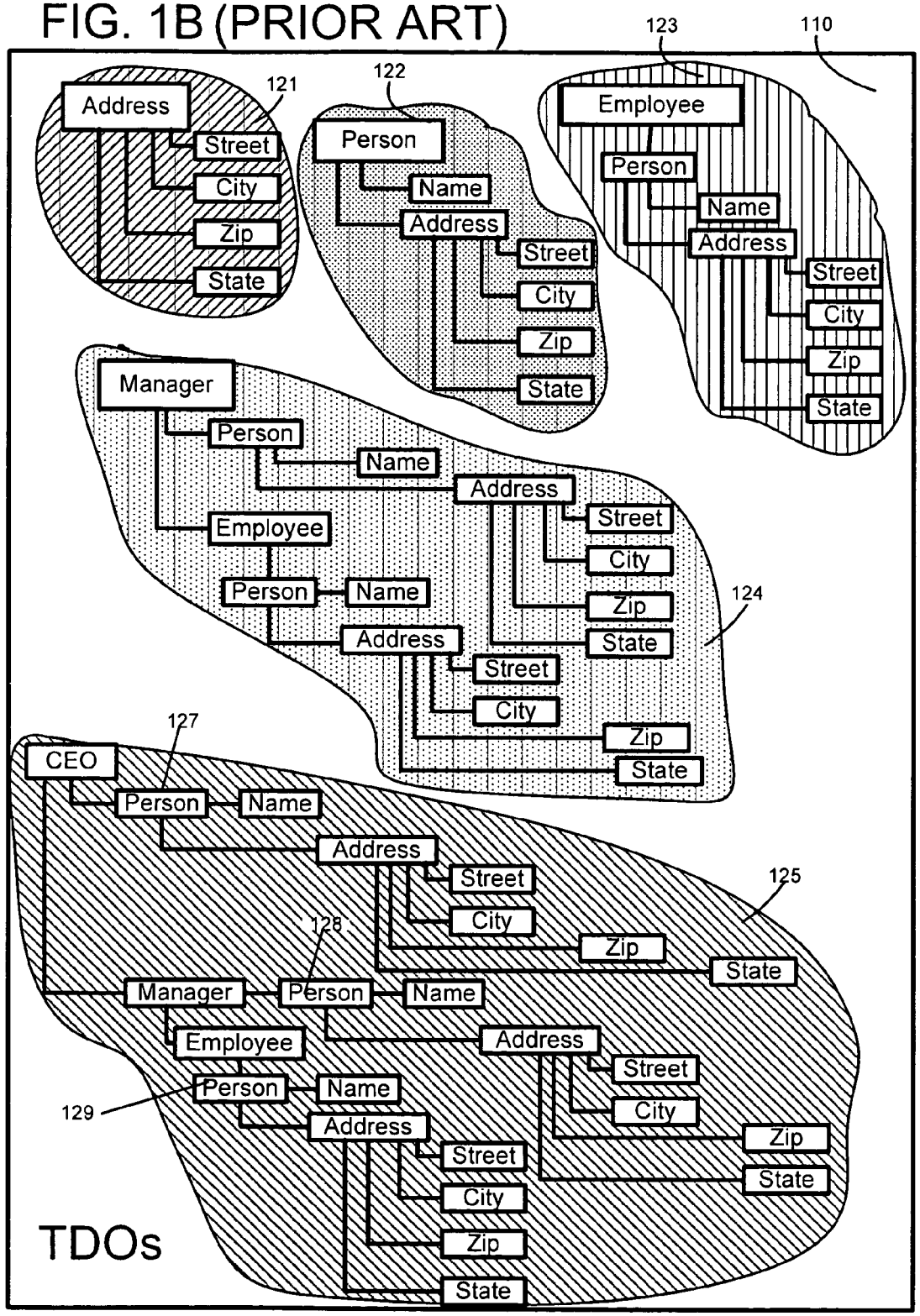
FIG. 1B illustrates a memory 110 (of computer 100 of FIG. 1A) that is encoded with TDOs of the prior art.
Figure 1D:
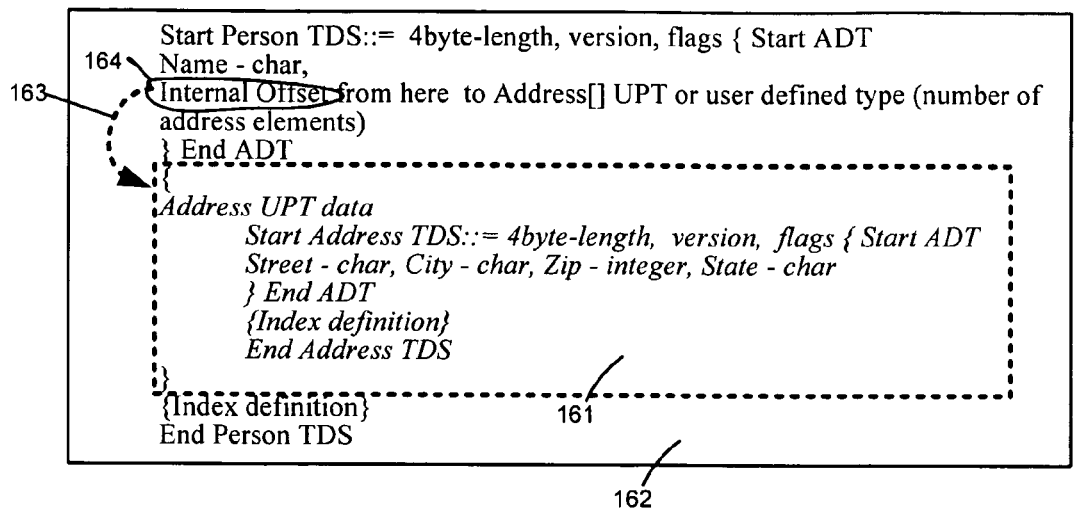
Figure 1E:
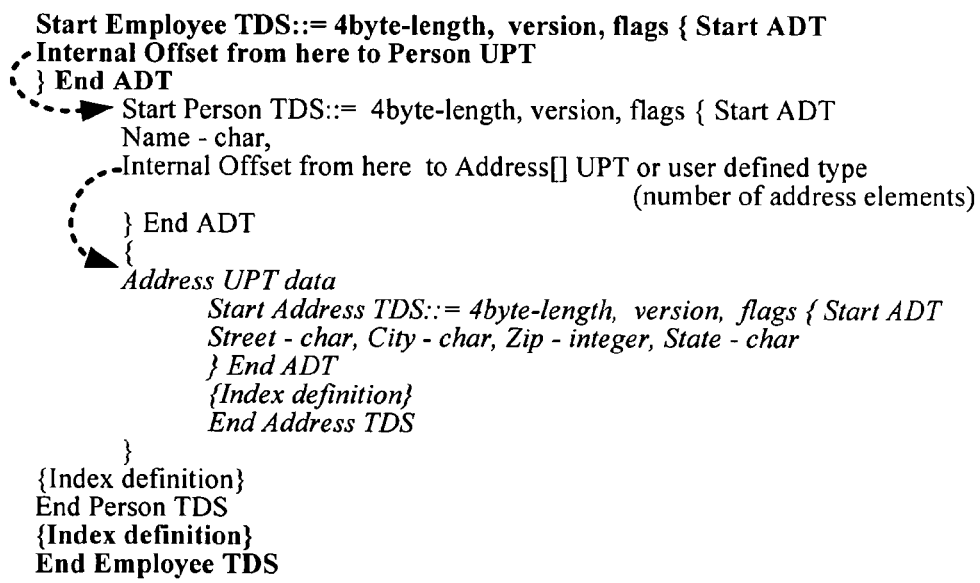

Note that several embodiments in accordance with the invention operate regardless of the depth at which a TDO occurs. For example, the Person attribute 127 in TDO 125 (FIG. 1B) is at level 2 which is at a lower depth than Person attribute 128. Person attribute 128 is at level 3 is at a lower depth than Person attribute 129 (which is at level 4). Note that in such embodiments, a top-level TDS 203 contains a single full TDS 210 regardless of the number of times it is referenced. In such embodiments, positioning of TDS 210 within TDS 203 may be done regardless of the depth at which the corresponding Person attributes 127-129 occur in original TDO 125 (FIG. 1B). Note that offsets 207, 208 and 209 in TDS 203 (FIG. 2B) have values which depend on their relative distance from whatever location is selected to position full TDS 210 within TDS 203.

As noted above, in some embodiments that avoid negative offsets, the position of full TDSs within top-level TDS is selected based on their frequency of reference by offsets within the top-level TDS, and regardless of depth. In the example shown in FIG. 2B, full TDS 210 for the Person attribute is located at the very end, because it happens to be the most frequently used full TDS.

Numerous modifications and adaptations of the embodiments described herein are encompassed by the scope of the invention.

The following appendices A and B are integral parts of this detailed description and are incorporated by reference herein in their entirety. These appendices provide further detailed descriptions of implementation of an illustrative embodiment of the type shown in FIG. 2A.

APPENDIX A (Datastructure Details)

```
1 /* This structure associates a TDO to TDS (user data) and keeps count of number of
2 occurrences of type identified by TDO so that we do not make multiple copies. It also
3 keeps a DAR ("dynamic array" or list) of all cells referring to the type. Elements of the
4 dynamic array are accessible by indexing, as in a static array. A dar element (as shown
5 below) is created for every embedded type that occurs, while traversing the type
6 hierarchy as part of Identify__ADTs ( ).
7 */
8 struct udata__cell
9 {
10  unsigned integer    weight; /* number of occurrences of embedded type */
11                              /*It is used to copy */
12                              /* the TDS of UPT at the end to */
13                              /* avoid a negative offset. */
14  unsigned integer    level;   /* Level/depth of the embedded type */
15  dvoid      *ptdo; /* TDO of the parent type */
16  dvoid      *petdo; /* TDO of embedded type in ptdo */
17  unsigned char    *pudata; /* Shell TDS of this type */
18  udata__cell *pcell; /* Pointer to a cell this type */
19                              /* is referred by, only set for */
20                              /* duplicate types and pointed */
21                              /* to cell can refer to another */
22                              /* cell referring the same type */
23  unsigned integer     patchloc; /* location in tds to patch, */
24                              /* once cell has been procesed */
25  unsigned integer   loc; /* location of the offset in UPT */
26  udata__cell *ptopInk;    /* link to ADT it belongs to */
27  udata__cell *pbotInk;    /* link to ADT at same level */
28  boolean       blnTODO;    /* TRUE, cell is in DAR */
29 };
30 /*
31 Structure below is used to copy portions of the udata__cell for sorting. In this algorithm,
32 sorting is done to avoid negative offsets.
33 */
34 struct udata__sort
35 {
36  unsigned integer   level;    /* Level/depth this ADT is in */
37  unsigned integer   weight; /* # of times this type occurred. */
38                              /* It is used to copy the TDS of */
```

APPENDIX A-continued

(Datastructure Details)

```
39                    /* UPT at end to avoid -ve offset */
40  udata_cell *pcell; /* First cell referring this type    */
41  unsigned integer  pos; /* Position in DAR where the element */
42                         /* occurs */
43 };
44 /*
45 Structure below is used during generation of the TDS and serves as the context. When
46 bMainTDS is FALSE, it indicates that we are generating a shell TDS. Only after the first
47 pass (build_list) this flag s set to TRUE to generate the final TDS of the given type.
48 */
49 struct udata_ctx
50 {
51   kopdar *pudata;   /* DAR of udata_cell elements describing all the types within given
52 type */
53   kopdar *psort; /* DAR to containing the sorted list of udata_sort cells in ascending
54 order of wight */
55                      /* pudata DAR          */
56   dvoid *ptdo;       /* TDO or type whose TDS is being genereated */
57   udata_cell *pcell;   /* Cell at pos */
58   unsigned integer pos;        /* Index of the element within pudata DAR */
59   unsigned integer level; /* level for which TDS is being generated */
60   boolean bMainTDS; /* TRUE, generate TDS for the MAIN TDO requested */
61 };
62 struct kopttbc
63 {
64  unsigned char opcode;         /* the opcode of the cell */
65  unsigned char args[KOPT_TDSCELL_MAXARGS];
66                       /* the arguments that some opcodes take */
67  unsigned integer tdsloc;     /* location in tds where this cell is defined */
68  unsigned char *uptdata;       /* user data pointer for upt */
69 #define KOPT_DUP_IN_BCELL 0x02 /* uptdata ptr refers to a duplicate udata_cell */
70 #define KOPT_DAT_IN_BCELL 0x04 /* uptdata ptr refers to the TDS */
71                       /* containing uptdata          */
72  unsigned char isTDO_or_CELL; /* Discriminant, to indicate what uptdata refers to */
73 };
74 /* This structure is used to store todo list in the second pass by koptgen */
75 struct kopttodo
76 {
77  unsigned integer cell;         /* cell number of kopttbc that created this
78 TODO cell */
79  unsigned integer patchloc;/* location of offset that must be patched when the tds is
80 copied */
81 };
```

APPENDIX B

(Psuedo-code Details)

```
1 Build TDS for a type given the TDO, all dependent types must have been created before
2 invoking this function to generate the TDS of the current type.
3 build_TDS(TDO to generate the TDS of, level)
4 {
5 For level one type, create a record of udata_cell, indicate that it is not a duplicate, assign
6 a weight of 1, store the passed-in TDO as the parent TDO(ptdo), current level as the level
7 and clear rest of the fields.
8 If udata cell for the given TDO does not indicate that it is a duplicate
9 Build list of duplicate types along with temporary TDS in the given type by calling
10 Identify_ADTs(TDO, level),
11 set bMainTDS to TRUE when level is 1, otherwise FALSE
12 setup udata_ctx structure, fill the given TDO as the ptdo, pcell points to udata cell of the
13 given type, pos is the index of pcell in the array of udata cells, level is the level below the
14 given type.
15 For each attribute in the given type (TDO) create a cell of kopttbc type with the opcode of
16 the type. Fill precision, scale, form of use, etc into args array depending on the type. In
17 case of user-defined type, record the opcode as UPT data. If the user defined type is a
18 duplicate then set the uptdata pointer to point to udata_cell that we created in
19 Identify_ADTs, set KOPT_DUP_IN_BCELL value in isTDO_or_CELL so that we can fix
20 the offsets in tdsgen( ). In case of non-duplicate type, set the uptdata pointer to point to
21 the TDS of this type and isTDO_or_CELL to KOPT_DAT_IN_BCELL. Add this cell to a
22 list of kopttbc cells in the order it is encountered.
23 Generate the TDS based on the list of kopttbc structures by calling tdsgen( )
24 }
25 Identify_ADTs(TDO, level)
26 {
```

APPENDIX B-continued (Psuedo-code Details)

```
27 Increment level by 1. (we are going to the next level in the passed in TDO)
28 For each attribute in the given type walk the type hierarchy from left to right.
29 If it is a user-defined type, obtain its TDO from the passed-in TDO, check its existence in
30 the list of encountered types.
31 If one is found, increase the weight in the cell where it occurred first (base). Create a
32 record of udata_cell, indicate that it is a duplicate type, store the passed-in TDO as the
33 parent TDO(ptdo), store TDO of this embedded type in petdo, current level as the level,
34 and clear all other members in the record. Weight for this newly encountered type
35 remains zero. Fill the pcell pointer of the original udata_cell that is duplicate of to refer to
36 this cell in a linear list at the end in the order encountered. Now generate the shell TDS
37 for this duplicate type by calling build_tds(TDO of the embedded type, current level).
38 If it is the first occurrence of the type, create a record of udata_cell, indicate that it is not a
39 duplicate, assign a weight of 1, store the passed-in TDO as the parent TDO(ptdo), store
40 TDO of this embedded type in petdo, current level as the level. Now generate the TDS of
41 this embedded type by calling build_tds(TDO of embedded type, current level).
42 Add this record in the list, store the TDS obtained from build_tds in pudata member of the
43 structure.
44 NOTE: Shell TDS is an outline containing the opcodes of each type encountered; it is not
45 fully functional TDS, because the offsets or pointers are not filled, they are just place-
46 holders.
47 }
48 tdsgen( )
49 {
50 1.      First calculate the size of memory required by using the steps 4 through 10, we
51 do not perform any copies in this pass.
52 2.      Allocate memory for the TDS
53 3.      Fill the header fields except the length
54 4.      Determine the size of the fixed header. For all elements in the list of kopttbc clear
55 the offsets or the pointers (we will fill them later)
56 5.      Traverse the list of attributes in kopttbc structure in order
57 If the attribute is an user-defined type then obtain its kopttbc structure based on its
58 attribute number, note the location where the opcode and the arguments will be copied in
59 tdsloc member, copy the opcode and the arguments associated with the UPT. Create a
60 TODO cell, compute the location of the offset (patchloc) that needs to be patched for
61 duplicate types (this location needs to be updated in the final pass with the correct offset
62 as part of step 10). If the type is not a duplicate then the patch location will be filled in
63 step 8. Add TODO cell to TODO list of cells that needs to be patched after the TDS it
64 points to is copied into memory.
65 Else copy the opcode along with the arguments in kottcb structure. (Arguments is an
66 array of memory containing information related to the type, see KOPM_OTS_TYPE)
67 6.      Reverse the todo list when generating TDS of level 1 type to obtain positive
68 offsets if required
69 7.      For each element in the reversed todo list
70 Fetch the todo cell element.
71 Ensure that the offset has not been patched.
72 If the cell points to a duplicate type, get the uptdata pointer of the cell containing the
73 location to patch and update the flag indicating that it is part of todo processing. Update
74 the patchloc member of udata_cell with ptahcloc in todo list, loc member of udata_cell
75 with tdsloc member of kopttbc structure.
76 Else copy the TDS (uptdata points to the TDS) of the non-duplicate type, update the
77 patchloc member of udata_cell with patchloc int todo list, loc member of udata_cell with
78 tdsloc member of kopttbc structure.
79 8.      Perform todo processing of non-duplicates. Each element in the todo_list
80 contains a pointer to the TDS, copy its contents and update offset (patch location) with
81 the relative offset of the TDS and update the flag indicating that the offset is generated as
82 part of todo processing.
83 9.      Sort the list of duplicate types using quick sort in ascending order of weight.
84 10.     If we are dealing with MAIN TDS list starting at the last element
85 If the weight is greater than 1 get the location of TDS (stored in step 7).
86 For all references of this type (duplicates) stored in list of udata_cell
87 Compute the relative offset and patch it.
88 11.     Update the length in the header by calculating the size of the TDS and ensuring
89 that it is equal to the one we computed in step 1.
90 }.
```

What is claimed is:

1. A method performed in a computer, for processing metadata, the method comprising:

automatically identifying, within said metadata, a plurality of occurrences of a second abstract data type embedded within a first abstract data type, said plurality of occurrences being identified as redundant relative to one another; and based on identification of said plurality of occurrences, automatically generating, for the first abstract data type, a first description comprising a second description of the second abstract data type and a plurality of offsets that identify a common position of said second description within said first description;

wherein each offset is located in the first description in correspondence with an occurrence of the second abstract data type in the first abstract data type; and wherein said plurality of offsets have a corresponding plurality of values depending at least on said common position; and automatically storing in a memory of said computer at least said first description comprising said second description, and said plurality of offsets.

2. The method of claim 1 wherein:

the plurality of offsets are equal in number to the plurality of occurrences of said second abstract data type.

3. The method of claim 1 further comprising:

automatically identifying a plurality of occurrences of a third abstract data type embedded within any one or more of (the first abstract data type and the second abstract data type); and automatically including in said first description, a third description of the third abstract data type, and a plurality of additional offsets to another common position of the third description;

wherein each additional offset is located in the first description in correspondence with an occurrence of the third abstract data type.

4. The method of claim 3 further comprising:

automatically positioning the second description and the third description relative to one another, based on a first number of occurrences of the second abstract data type relative to a second number of occurrences of the third abstract data type.

5. The method of claim 4 wherein:

the relative relationship is ascending order.

6. The method of claim 3 wherein:

a first occurrence in the plurality of occurrences of the third abstract data type is embedded within the second abstract data type; and a first additional offset in the plurality of additional offsets corresponds to said first occurrence.

7. The method of claim 6 wherein:

a second occurrence in the plurality of occurrences of the third abstract data type is embedded within a fourth abstract data type, the fourth abstract data type being embedded within the first abstract data type; and a second additional offset in the plurality of additional offsets corresponds to said second occurrence.

8. The method of claim 6 wherein:

a second occurrence in the plurality of occurrences of the third abstract data type is embedded within a fourth abstract data type, the fourth abstract data type being embedded within the second abstract data type; and a second additional offset in the plurality of additional offsets corresponds to said second occurrence.

9. The method of claim 6 wherein:

a second occurrence in the plurality of occurrences of the third abstract data type is embedded within the first abstract data type and outside the second abstract data type; and a second additional offset in the plurality of additional offsets corresponds to said second occurrence.

10. The method of claim 6 wherein:

said first additional offset is located within the second description and identifies a position of the third description outside of the second description.

11. The method of claim 1 wherein:

the automatically identifying is performed by traversing a graph representative of the first abstract data type recursively.

12. The method of claim 1 wherein:

said common position of said second description within said first description is selected regardless of depth of the second abstract data type within the first abstract data type.

13. The method of claim 1 wherein:

said common position of said second description within said first description is selected based on frequency of occurrence of the second abstract data type within the first abstract data type.

14. The method of claim 1 wherein:

each offset is self-referential.

15. The method of claim 1 wherein:

the value of each offset further depends on a location of said each offset.

16. The method of claim 1 wherein:

the value of each offset further depends on a beginning or an end of the first description.

17. The method of claim 1 wherein:

at least one of said offsets is an external offset; and at least another of said offsets is an internal offset.

18. A storage device a plurality of instructions, said plurality of instructions comprising:

instructions to identify a plurality of occurrences of a second abstract data type embedded within a first abstract data type, said plurality of occurrences being identified as redundant relative to one another; and instructions, responsive to identification of said plurality of occurrences, to generate, for the first abstract data type, a first description comprising a second description of the second abstract data type and a plurality of offsets that identify a common position of said second description within said first description;

wherein each offset is located in the first description in correspondence with an occurrence of the second abstract data type in the first abstract data type; and wherein said plurality of offsets have a corresponding plurality of values depending at least on said common position; and instructions to store the first description including the second description comprised therein and the plurality of offsets to the common position of the second description.

19. The storage device of claim 18 further comprising:

instructions to store a third description and a plurality of additional offsets in the first description describing a location of the third description.

20. The storage device of claim 19 wherein:

the third description is at a position outside of the second description;

at least one of said additional offsets is located within the second description and identifies the position of the third description outside of the second description.

21. The storage device of claim 18 wherein:

the value of each offset further depends on a location of said each offset.

22. The storage device of claim 18 wherein:

the value of each offset further depends on a beginning or an end of the first description.

23. The storage device of claim 18 wherein:

at least one of said offsets is an external offset; and at least another of said offsets is an internal offset.

24. The storage device of claim 18 wherein:

said common position of said second description within said first description is selected based on frequency of occurrence of the second abstract data type within the first abstract data type.

25. A storage device comprising:
a plurality of instructions to generate a plurality of offsets relative to a common position in a data structure; and
a plurality of instructions to generate a first description of a first abstract data type, the first description comprising a second description of a second abstract data type at said common position; and
a plurality of instructions to store said plurality of offsets;
wherein said plurality of offsets have a corresponding plurality of values depending at least on said common position.

26. The storage device of claim 25 wherein:
said plurality of instructions comprise additional instructions to generate additional offsets relative to an additional position in said data structure;
the first description further comprises a third description of a third abstract data tyre at said additional position; and
each additional offset has an additional value depending on an additional location of the additional offset in said data structure and said additional position of the third description.

27. The storage device of claim 25 wherein:
at least one of said offsets is an external offset; and
at least another of said offsets is an internal offset.

28. The storage device of claim 25 wherein:
the value of each offset further depends on a location of said each offset.

29. The storage device of claim 25 wherein:
the value of each offset further depends on a beginning or an end of the first description.

30. The storage device of claim 25 wherein:
at least one of said offsets is an external offset; and
at least another of said offsets is an internal offset.

31. The storage device of claim 25 wherein:
said common position of said second description within said first description is selected based on frequency of occurrence of the second abstract data type within the first abstract data type.

32. A computer programmed to process metadata, the computer comprising:
means for traversing within said metadata a graph that represents a first abstract data type, to identify each redundant occurrence of a second abstract data type embedded therein;
means, coupled to said means for traversing, for generating a first description of the first abstract data type, the first description comprising a second description of the second abstract data type and a plurality of offsets to a common position of the second description; and
memory comprising said first description comprising said second description, and said plurality of offsets;
wherein said plurality of offsets have a corresponding plurality of values depending at least on said common position.

33. The computer of claim 32 wherein:
each offset is self-referential.

34. The computer of claim 32 further comprising:
means for keeping a count of each occurrence of the second abstract data type, comprised in the means for traversing; and
means for positioning the second description relative to a third description of a third abstract data type, based at least partially on the count;
wherein the third description is comprised in the first description.

* * * * *

UNITED STATES PATENT AND TRADEMARK OFFICE
CERTIFICATE OF CORRECTION

| | | |
|---|---|---|
| PATENT NO. | : 7,711,695 B2 | |
| APPLICATION NO. | : 11/038596 | |
| DATED | : May 4, 2010 | |
| INVENTOR(S) | : Rajendra S. Pingte et al. | |

It is certified that error appears in the above-identified patent and that said Letters Patent is hereby corrected as shown below:

Title Page;

On the face page, in field (57), in column 2, in "Abstract", line 7, delete "tap-level" and insert -- top-level --, therefor.

On the face page, in field (57), in column 2, in "Abstract", line 13, delete "tap-level" and insert -- top-level --, therefor.

On the face page, in field (57), in column 2, in "Abstract", line 16, after "space" insert -- reduced --.

In column 7, line 53, after "ADTs"" insert -- . --.

In column 12, line 9, after "to" delete "is".

In column 17, line 25, after "2004" insert -- . --.

In column 24, line 22, in claim 18, after "device" insert -- of --.

In column 25, line 17, in claim 26, delete "tyre" and insert -- type --, therefor.

Signed and Sealed this
Sixth Day of September, 2011

David J. Kappos
*Director of the United States Patent and Trademark Office*